(12) United States Patent
Antonopoulos

(10) Patent No.: US 12,174,987 B2
(45) Date of Patent: Dec. 24, 2024

(54) SYSTEM AND METHOD FOR REPRESENTING AND VERIFYING A DATA SET USING A TREE-BASED DATA STRUCTURE

(71) Applicant: Microsoft Technology Licensing, LLC, Redmond, WA (US)

(72) Inventor: Panagiotis Antonopoulos, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 613 days.

(21) Appl. No.: 17/173,039

(22) Filed: Feb. 10, 2021

(65) Prior Publication Data

US 2022/0253546 A1    Aug. 11, 2022

(51) Int. Cl.
*G06F 16/22*    (2019.01)
*G06F 11/14*    (2006.01)
*G06F 21/62*    (2013.01)

(52) U.S. Cl.
CPC ...... *G06F 21/6227* (2013.01); *G06F 11/1448* (2013.01); *G06F 16/2246* (2019.01); *G06F 16/2255* (2019.01); *G06F 16/2272* (2019.01)

(58) Field of Classification Search
CPC ............. G06F 21/6227; G06F 16/2246; G06F 16/2272; G06F 16/2255; G06F 11/1448
See application file for complete search history.

(56) References Cited

U.S. PATENT DOCUMENTS

| | | | |
|---|---|---|---|
| 10,581,616 B1* | 3/2020 | Paruzel | .................. H04L 9/3247 |
| 2019/0103973 A1* | 4/2019 | Chalkias | .............. H04L 63/0442 |
| 2019/0197562 A1 | 6/2019 | Woerner et al. | |
| 2020/0076571 A1* | 3/2020 | Natarajan | ........... G06F 16/2246 |

FOREIGN PATENT DOCUMENTS

| | | | |
|---|---|---|---|
| EP | 3176997 A1 | 6/2017 | |
| EP | 3413252 A1 | 12/2018 | |

OTHER PUBLICATIONS

"Amazon Quantum Ledger Database (QLDB)", Retrieved from: https://web.archive.org/web/20200504003807/https://aws.amazon.com/qldb/, May 4, 2020, 11 Pages.
(Continued)

*Primary Examiner* — Irete F Ehichioya
*Assistant Examiner* — Ken Hoang
(74) *Attorney, Agent, or Firm* — Weaver IP L.L.C.

(57) ABSTRACT

Embodiments described herein are directed to generating a tree-based data structure representative of a data set and the verification thereof. As each data item of a data set is updated, a leaf node is generated that stores a hash value therefor. For every even leaf node generated, a parent node storing a hash value based on the hash values of its child nodes is generated. For each level of the tree, the hash value of the last odd node generated therefor is maintained. The foregoing process is performed recursively at each level of the tree. During verification, a new root hash value is determined for a new tree-based data structure generated for the data set to be verified. The old and new root hash values are compared. If the hash values do not match, a remediation is performed to restore the data set.

20 Claims, 12 Drawing Sheets

(56) References Cited

OTHER PUBLICATIONS

"Azure SQL Database Point in Time Restore", Retrieved from: https://azure.microsoft.com/en-us/blog/azure-sql-database-point-in-time-restore/, Oct. 1, 2014, 11 Pages.

"ConsenSys", Retrieved from: https://web.archive.org/web/20210110163034/https://consensys.net/quorum/, Retrieved Date: Jan. 10, 2021, 8 Pages.

"Corda", Retrieved from: https://web.archive.org/web/20210101110336/https://www.corda.net/, Jan. 1, 2020, 7 Pages.

"Ethereum", Retrieved from: https://web.archive.org/web/20210104142931/https://ethereum.org/en/, Jan. 4, 2021, 4 Pages.

"Everledger", Retrieved from: https://web.archive.org/web/20210120200632/https://www.everledger.io/, Jan. 12, 2021, 12 Pages.

"Oracle Database", Retrieved from: https://docs.oracle.com/en/database/oracle/oracle-database/21/nfcon/learning-database-new-features-222773864.html, Jan. 2021, 3 Pages.

Androulaki, et al., "Hyperledger fabric: a distributed operating system for permissioned blockchains", in Proceedings of the Thirteenth EuroSys Conference, Apr. 2018, 15 Pages.

Antonopoulos, et al., "Socrates: The New SQL Server in the Cloud", in Proceedings of the International Conference on Management of Data, Jun. 30, 2019, pp. 1743-1756.

Arasu, et al., "Concerto: a high concurrency key-value store with integrity", in Proceedings of the 2017 ACM International Conference on Management of Data, May 9, 2017, 16 Pages.

Bajaj, et al., "TrustedDB: A Trusted Hardware-Based Database with Privacy and Data Confidentiality", in Proceedings of the IEEE Transactions on Knowledge and Data Engineering, vol. 26, Issue 3, Mar. 2014, pp. 752-765.

Baumann, et al., "Shielding Applications from an Untrusted Cloud with Haven", in Proceedings of 11th USENIX Symposium on Operating Systems Design and Implementation, Oct. 6, 2014, pp. 267-283.

Bellare, et al., "Forward Integrity for Secure Audit Logs", in Technical report, Computer Science and Engineering Department, University of California at San Diego, Nov. 23, 1997, 16 Pages.

Devanbu, et al., "Authentic Data Publication over the Internet", in Journal of Computer Security, vol. 11, Issue 3, Mar. 2003, pp. 1-22.

Huang, et al., "Store business-critical blob data with immutable storage", Retrieved from: https://docs.microsoft.com/en-us/azure/storage/blobs/storage-blob-immutable-storage?tabs=azure-portal, Nov. 13, 2020, 12 Pages.

Jain, et al., "Trustworthy Data from Untrusted Databases", in Proceedings of the 29th International Conference on Data Engineering (ICDE), Apr. 8, 2013, pp. 529-540.

Lamport, et al., "The Byzantine Generals Problem", in Journal of ACM Transactions on Programming Languages and Systems, vol. 4, Issue 3, Jul. 1982, pp. 382-401.

Li, et al., "Dynamic Authenticated Index Structures for Outsourced Databases", in Proceedings of the ACM SIGMOD International Conference on Management of Data, Jun. 27, 2006, 12 Pages.

McConaghy, et al., "BigchainDB: A Scalable Blockchain Database", Retrieved From: https://mycourses.aalto.fi/pluginfile.php/378362/mod_resource/content/1/bigchaindb-whitepaper.pdf, Jun. 8, 2016, 65 Pages.

McKeen, et al., "Innovative Instructions and Software Model for Isolated Execution", in Proceedings of the 2nd International Workshop on Hardware and Architectural Support for Security and Privacy, Jun. 23, 2013, 8 Pages.

Merkle, Ralph, "A digital signature based on a conventional encryption function", in Proceedings of the International Cryptology Conference (CRYPTO), Aug. 16, 1987, pp. 369-378.

Mohan, et al., "ARIES: A Transaction Recovery Method Supporting Fine-Granularity Locking and Partial Rollbacks Using Write-Ahead Logging", in Journal of ACM Transactions on Database Systems, vol. 17, Issue 1, Mar. 1992, 69 Pages.

Mykletun, et al., "Authentication and Integrity in Outsourced Databases", in Journal of ACM Transactions on Storage, vol. 2, Issue 2, Feb. 5, 2004, pp. 1-32.

Nakamoto, Satoshi, "Bitcoin: A Peer-to-Peer Electronic Cash System", in Whitepaper BigChainDB, Aug. 21, 2008, 9 Pages.

Pang, et al., "Authenticating Query Results in Edge Computing", in Proceedings of the 20th International Conference on Data Engineering, Mar. 30, 2004, 12 Pages.

Pang, et al., "Verifying Completeness of Relational Query Results in Data Publishing", in Proceedings of the ACM SIGMOD international conference on Management of data, Jun. 14, 2005, 12 Pages.

Schuhknecht, et al., "ChainifyDB: How to Blockchainify any Data Management System", in Repository of arXiv:1912.04820v1, Dec. 10, 2019, pp. 1-31.

Singh, et al., "Ensuring Correctness over Untrusted Private Database", in Proceedings of the 11th International Conference on Extending Database Technology: Advances in Database Technology, Mar. 25, 2008, pp. 476-486.

Stein, et al., "Copy a transactionally consistent database in Azure SQL Database", Retrieved from: https://docs.microsoft.com/en-us/azure/azure-sql/database/database-copy?tabs=azure-powershell, Oct. 30, 2020, 12 Pages.

Zhang, et al., "IntegriDB: Verifiable SQL for outsourced databases", in Proceedings of the 22nd ACM SIGSAC Conference on Computer and Communications Security, Oct. 2015, pp. 1480-1491.

"International Search Report and Written Opinion Issued in PCT Application No. PCT/US22/013082", Mailed Date: May 4, 2022, 12 Pages.

Communication under Rule 71(3) received in European Application No. 22704073.0, mailed on Jun. 7, 2024, 7 pages.

Decision to grant a European patent pursuant to Article 97(1) received in European Application No. 22704073.0, mailed on Oct. 4, 2024, 2 pages.

\* cited by examiner

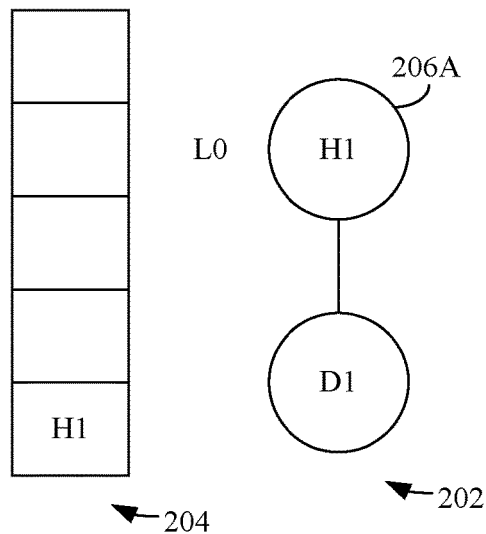 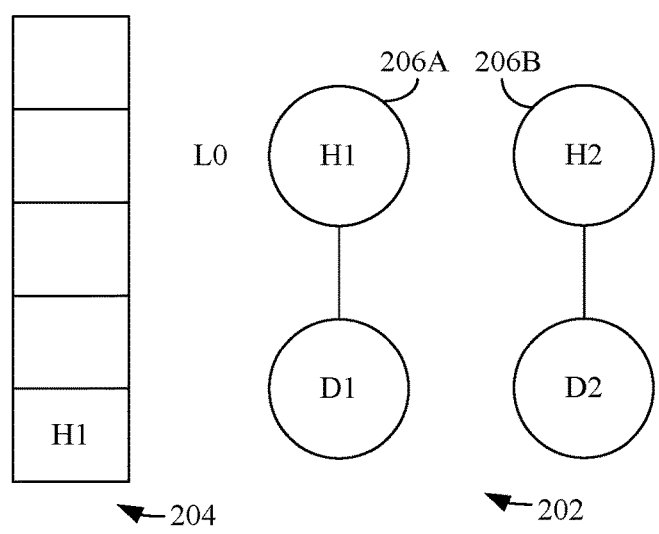
FIG. 2A  FIG. 2B
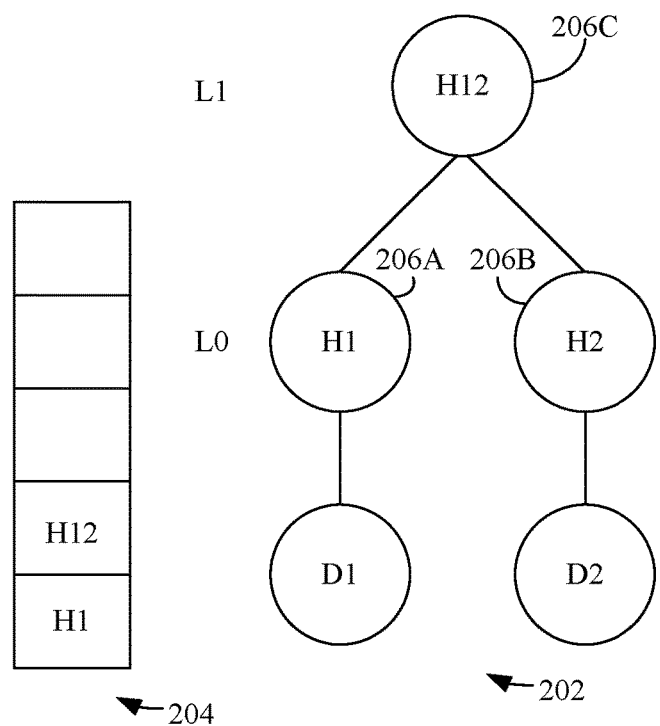
FIG. 2C

SYSTEM AND METHOD FOR REPRESENTING AND VERIFYING A DATA SET USING A TREE-BASED DATA STRUCTURE

BACKGROUND

Establishing trust around the integrity of data stored in database systems has been a long-standing problem for all organizations that manage financial, medical or other sensitive data. Systems that maintain such data are also known as systems of record (SOR) and need to guarantee the fidelity of their data for legal and compliance reasons. This is extremely challenging since attackers or high privileged users, such as database or system administrators who have full control of the system, can easily tamper with the data and erase any traces of their actions. Additionally, as more organizations move their data into the cloud, the cloud provider and any operators also need to be trusted to maintain the integrity of the data they manage, significantly expanding the trust boundary.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums described herein are directed to compute and storage-efficient techniques for generating a tree-based data structure representative of a data set and the verification thereof. For instance, as each data item of a data set is updated (e.g., via a database transaction), a leaf node is generated that stores a hash value of that data item. For every even leaf node generated, a parent node for that leaf node and its sibling(s) are generated. The parent node stores a hash value based on the hash values of its child leaf nodes. For each level of the tree, the hash value of the last odd node generated therefor is stored in a different data structure (i.e., a state data structure). The foregoing process is performed recursively at each level of the tree, as long as a new node is to be generated at a parent level. The state data structure is used to retrieve hash values for generating parent nodes. After leaf nodes have been generated for all the updated data items of the data set, the resulting root node generated for the tree-based data structure stores a root hash value representative of the entire data set. The root hash value is subsequently utilized to verify whether the data set has been modified. For instance, during a verification process, the data set is retrieved, and a new tree-based data structure is generated in accordance with the foregoing process. The tree-based data structure is generated based on the same order in which the data items were updated. After the root hash value is determined for the new tree-based data structure, the root hash value is compared to the original root hash value determined for the data set. If the root hash values match, it is determined that the data set has not been modified. If the root hash values do not match, it is determined that the data set has been modified, and a remediation is performed to restore the data set.

Further features and advantages, as well as the structure and operation of various example embodiments, are described in detail below with reference to the accompanying drawings. It is noted that the example implementations are not limited to the specific embodiments described herein. Such example embodiments are presented herein for illustrative purposes only. Additional implementations will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate example embodiments of the present application and, together with the description, further serve to explain the principles of the example embodiments and to enable a person skilled in the pertinent art to make and use the example embodiments.

FIGS. 2A-2J depict diagrams illustrating a streaming technique utilized to generate a tree-based data structure and to update a state data structure for maintaining the state of the tree-based data structure in accordance with an example embodiment.

Figure 1:
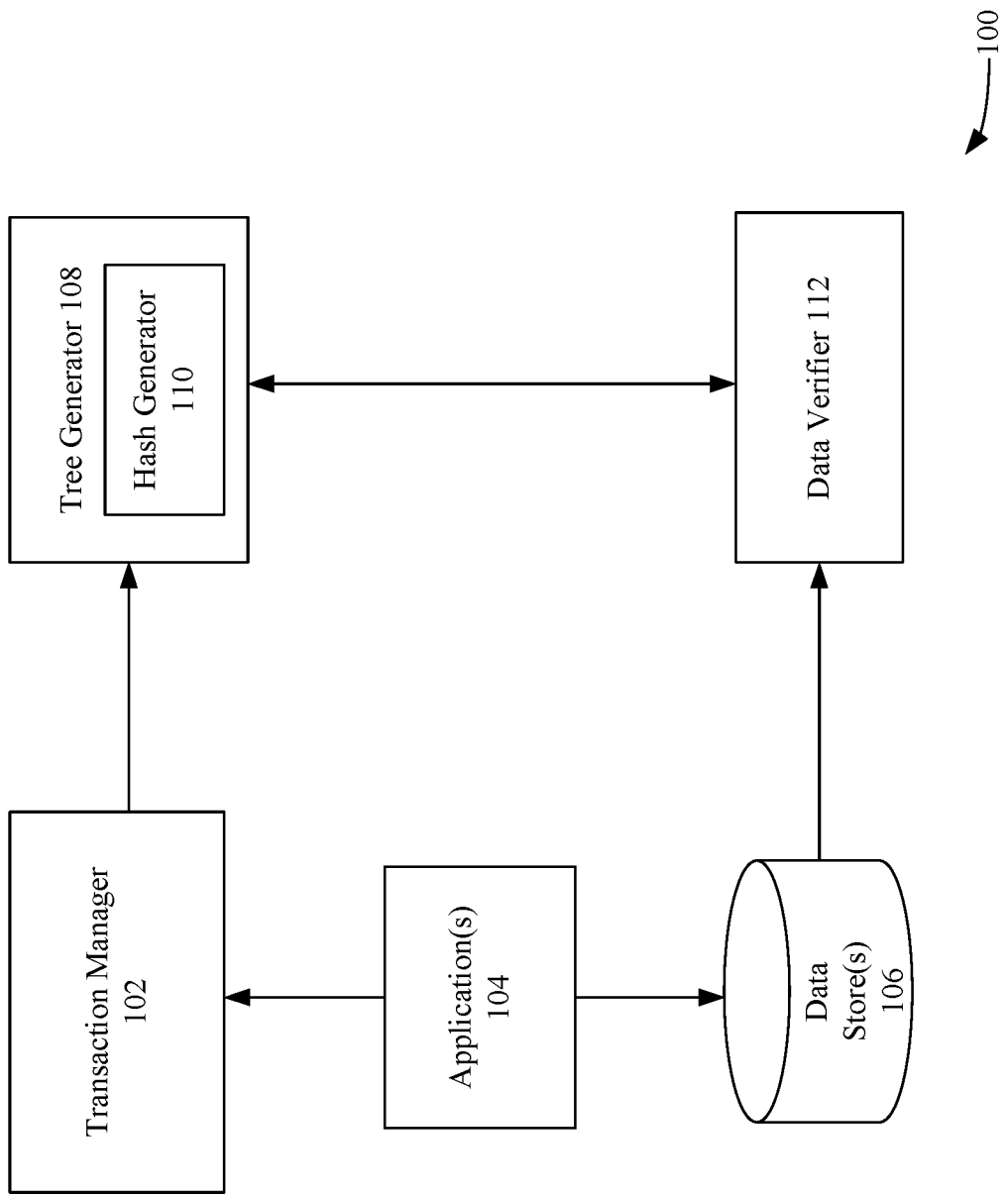
FIG. 1 shows a block diagram of system for generating a tree-based data structure representative of a data set and for the verification thereof in accordance with an example embodiment.

The features and advantages of the implementations described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose numerous example implementations. The scope of the present application is not limited to the disclosed implementations, but also encompasses combinations of the disclosed implementations, as well as modifications to the disclosed implementations. References in the specification to "one implementation," "an implementation," "an example embodiment," "example implementation," or the like, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of persons skilled in the relevant art(s) to implement such feature, structure, or characteristic in connection with other implementations whether or not explicitly described.

In the discussion, unless otherwise stated, adjectives such as "substantially" and "about" modifying a condition or relationship characteristic of a feature or features of an implementation of the disclosure, should be understood to mean that the condition or characteristic is defined to within tolerances that are acceptable for operation of the implementation for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous example embodiments are described as follows. It is noted that any section/subsection headings provided herein are not intended to be limiting. Implementations are described throughout this document, and any type of implementation may be included under any section/subsection. Furthermore, implementations disclosed in any section/subsection may be combined with any other implementations described in the same section/subsection and/or a different section/subsection in any manner.

II. Example Implementations

Embodiments described herein are directed to compute and storage-efficient techniques for generating a tree-based data structure representative of a data set and the verification thereof. For instance, as each data item of a data set is updated (e.g., via a database transaction), a leaf node is generated that stores a hash value of that data item. For every even leaf node generated, a parent node for that leaf node and its sibling(s) are generated. The parent node stores a hash value based on the hash values of its child leaf nodes. For each level of the tree, the hash value of the last odd node generated therefor is stored in a different data structure (i.e., a state data structure). The foregoing process is performed recursively at each level of the tree, as long as a new node is to be generated at a parent level. The state data structure is used to retrieve hash values for generating parent nodes. After leaf nodes have been generated for all the updated data items of the data set, the resulting root node generated for the tree-based data structure stores a root hash value representative of the entire data set. The root hash value is subsequently utilized to verify whether the data set has been modified. For instance, during a verification process, the data set is retrieved, and a new tree-based data structure is generated in accordance with the foregoing process. The tree-based data structure is generated based on the same order in which the data items were updated. After the root hash value is determined for the new tree-based data structure, the root hash value is compared to the original root hash value determined for the data set. If the root hash values match, it is determined that the data set has not been modified. If the root hash values do not match, it is determined that the data set has been modified, and a remediation is performed to restore the data set.

As used herein, a tree-based data structure is defined as a collection of nodes starting at a root node (the uppermost node where the tree is represented as spreading downward), where each node includes a value and references to one or more other nodes ("child" nodes) represented by edges (or links). By convention, tree-based data structures are typically represented as growing downwards but may be oriented in other directions. Internal nodes of a tree-based data structure, or "parent nodes," have child nodes (nodes below them in the tree). Leaf nodes are nodes having no child nodes. A Merkle tree, as known to persons skilled in the relevant art(s), is a tree-based data structure where every leaf node is labelled with the cryptographic hash of a data block, and every non-leaf node is labelled with the cryptographic hash of the labels of its child nodes. A "blockchain" (or "block chain") is a sequence ("chain") of records (e.g., in a list), referred to as "blocks," that are linked using cryptography. Each block in the "chain" contains a cryptographic hash of the previous block, a timestamp, and transaction data.

Conventional techniques generate a tree-based data structure after all data items have been updated and in a bottom-up fashion by computing the parent of every two leaf nodes, storing these nodes, then repeating this process until the root node (the topmost node in a tree-based structure that expands downward) is reached. This requires the storing of all data elements and revisiting them to compute the parent hashes, which is very compute and storage inefficient. The techniques described herein generate a tree-based data structure as the data items are updated and only stores one hash per level of the tree, therefor having logarithmic space complexity. As such, there no longer is the need to revisit any of the data items to obtain their hash values. Instead, the hash stored for a particular level is utilized.

Accordingly, the techniques described are advantageously compute and memory-efficient, as the time complexity of such techniques is $O(N)$ and the space complexity is $O(\log N)$, where N is the number of leaf nodes of the tree-based data structure. The small space required to maintain the state of each level of the tree is also advantageously utilized to enable partial transaction rollbacks (e.g., supported by database applications). The logarithmic space needed for recording the state of the tree-based data structure enables a large number of savepoints to be supported with a minimal memory footprint and minimal overhead.

Moreover, the foregoing techniques advantageously improves the integrity of the data maintained by the database, and therefore, ensures that applications accessing the database operate on the correct data. That is, because the application utilizes valid data, the application will return valid results. Moreover, the availability of the database is improved, as hardware and/or software failures that are normally attributed to data inconsistencies is reduced. Still further, the performance of the database is improved, as the re-execution of queries that occurs (e.g., to retrieve a valid replica of the inconsistent data attempted to be accessed) is reduced.

Embodiments herein are applicable to system of record (SOR) applications (e.g., for banking, financial, healthcare, insurance applications, etc.) that maintain transaction histories for accounts, physician visits, prescriptions, medical records, and/or the like, which are expected by users thereof to provide security for their data and be able to prove that no transaction histories, medical records and medical history data, etc., have been improperly changed or otherwise tampered with. Embodiments are also extensible to security information and event management (SIEM) systems including physical access monitoring systems and security logging/monitoring systems, as well as to law enforcement systems that maintain databases of criminal evidence. Additionally, systems for analytics and reporting on shared data in blockchains, and/or the like, are also expected by users thereof to provide security for their data and be able to prove that no data and transaction histories have been tampered with, and the instant embodiments provide for that ability using cryptographic data structures and system implementations described herein. Embodiments provide for existing applications to remain unchanged in their underlying functionality, e.g., the full power and capability of a DB server to query relational transaction histories, as well as for rich ecosystems of reporting and development tools. That is, the solutions exemplarily described herein support existing DB server functionalities and are be easily adopted thereby.

For example, FIG. 1 shows a block diagram of system for generating a tree-based data structure representative of a data set and for the verification thereof, according to an example embodiment. As shown in FIG. 1, system 100 includes a transaction manager 102, one or more applications 104, one or more data stores 106, a tree generator 108, and a data verifier 112. Transaction manager 102, application(s) 104, data store(s) 106, tree generator 108, and/or data verifier 112 may be implemented via a respective computing device and/or may be communicatively coupled via one or more networks. Alternatively, one or more of transaction manager 102, application(s) 104, data store(s) 106, tree generator 108, and/or data verifier 112 may be implemented on the same computing device. Examples of network(s) include, but are not limited to, local area networks (LANs), wide area networks (WANs), enterprise networks, the Internet, etc., and may include one or more of wired and/or wireless portions. Data store 106 may be any type of physical memory and/or storage device that is described herein, and/or as would be understood by a person of skill in the relevant art(s) having the benefit of this disclosure.

Transaction manager 102 is configured to monitor transactions performed by application(s) 104. Example of application(s) 104 include, but are not limited to, a database application configured to perform transactions with respect to data items of a data set (e.g., a relational table, a set of transaction records, etc.), a blockchain engine configured to generate a digital ledger, etc. Examples of transactions include, but are not limited to, queries, joins, unions, insertions, deletions, modifications, etc. Examples of data items, include, but are not limited to, a database object (e.g., row(s) of a table, structured data, etc.), a record of a block chain transaction (e.g., a transaction with respect to a digital ledger utilized in a block chain, etc.), etc. The data set may be maintained by data store(s) 106. A transaction may be configured to add, update and/or modify any number of data items of a particular data set maintained by data store(s) 106. Transaction manager 102 may be configured to monitor each addition, update, or deletion of a data item for a given transaction. Transaction manager 102 may provide a notification to tree generator 108 as each data time is added, updated, and/or deleted. The notification may comprise a sequence number associated with each data item that has been added, updated, and/or deleted. The sequence numbers are representative of the order in which each data item was added, updated, and/or deleted with respect to a particular data set. Alternatively, application(s) 104 may provide such notifications directly to tree generator 108.

Tree generator 108 is configured to generate a tree-based data structure, such as, but not limited to a Merkle tree. The root of the tree-based structure comprises a hash value that is representative of all the data items added and/or updated to a particular data set. This is very efficient because it reduces a potentially huge volume of data down to a single hash value. The challenge, however, is that the number of data items updated or added can be very large and is not known upfront. Additionally, it would be inefficient to re-process them after the transaction that updates or adds the data items has completed.

Embodiments described herein utilize a streaming technique that generates the root of the tree-based data structure as each data item is updated and/or added to a data set (rather than waiting to generate the tree-based data structure after the entirety of the transaction is completed). For example, tree generator 108 may receive a notification from transaction manager 102 each time a data item is added and/or updated to a particular data set. Upon receiving a notification from transaction manager 102, tree generator 108 may generate a hash value for the data item. For example, as shown in FIG. 1, tree generator 108 may comprise a hash generator 110. Hash generator 110 is configured to, responsive to receiving a notification from transaction manager 102, generate a hash value (or "hash") for each data item added or updated for a given data set. In embodiments, any type of hash function may be used by hash generator 110 to generate hash values, such as but without limitation, SHA256 32-byte hashing. The hash value generated for a particular data item is stored in a newly-generated leaf node of the tree-based data structure, which is located at the lowest level (or L0) of the tree-based data structure.

After generating the leaf node, tree generator 108 determines whether the leaf node is an odd node or an even node with respect to the lowest level. In response to determining that the leaf node is an odd node, tree generator 108 stores the hash value of the leaf node in a first element of a data structure (referred herein as a state data structure). The data structure may be an array, linked list, etc., that stores, for each level of the tree-based data structure, the hash value of the last odd node generated therefor. In response to determining that the leaf node is an even node, tree generator 108 generates a parent (or intermediate) node at the next lowest level (e.g., L1) of the tree-based data structure. The parent node is the parent of the even node and the last node before the even node that was generated at the lowest level (i.e., the even node's sibling). Hash generator 110 generates a new hash value that is based on the hash values of the even node and its sibling node. The hash of the sibling node is retrieved from the state data structure. Tree generator 108 stores the new hash value in the parent node.

In response to generating the parent node, tree generator 108 determines whether the parent node is an odd node or an even node with respect to the L1. In response to determining that the parent node is an odd node, tree generator 108 stores the hash value of the parent node in a second element of the data structure. In response to determining that the parent node is an even node, tree generator 108 generates a parent (or intermediate) node at the next lowest level (e.g., L2) of the tree-based data structure. The parent node is the parent of the even node and the last node before the even node that was generated at the L1 (i.e., the parent node's sibling).

The foregoing operations are performed for each level in a recursive manner as long as a new node is to be added to a parent level of the tree-based data structure. When all leaf nodes have been appended to the tree-based data structure (at L0) (i.e., after the transaction has completed), a determination is made as to whether the last leaf node added at L0 is an even node or an odd node. If the last node is an even node, tree generator 108 generates a parent node at the next lowest level (i.e., L1), and hash generator 110 generates a new hash value that is based on the hash values of the even node and its sibling node in a similar manner as described above. If the last node is an odd node (i.e., it has no sibling)

the last node is promoted as its parent. This is also performed recursively until the root node of the tree-based data structure is reached.

The time complexity of this streaming technique is O(N) and the space complexity is O(log N), where N is the number of leaf nodes of the tree-based data structure. The small space required to maintain the intermediate state of tree (via the state data structure) is advantageously utilized to enable partial transaction rollbacks (e.g., supported by database applications). For example, when a savepoint is created in the transaction, the current state of the tree-based data structure is copied and maintained as part of the savepoint information. As more operations occur, the tree-based data structure gets updated as described above. However, if the transaction rolls back to this savepoint, the copied state is utilized to restore the tree-based data structure back to the state it had when the savepoint was created. The logarithmic space needed for recording the state of the tree-based data structure enables a large number of savepoints to be supported with a minimal memory footprint and minimal overhead.

The root hash value stored by the root node of tree-based data structure may obtained by data verifier 112 and utilized to verify the integrity of the data set represented thereby. For example, at a later point in time, one may desire to verify whether the data set has been modified and/or tampered with. Data verifier 112 is configured to obtain the data set from data store(s) 106 and provide each data item in the data set to tree generator 108. Data provider 112 provides each data item in the order in which the data item was appended to the tree-based data structure, as described above (e.g., using the sequence number). Tree generator 108 is configured to generate a tree-based data structure in the same manner as described above and determine the root hash value of the newly-generated tree-based data structure. Data verifier 112 compares this root hash value to the root hash value previously-obtained from the tree-based data structure. If the root hash values match, data verifier 112 determines that the data set has not been modified and/or tampered with. If the root hash values do not match, data verifier 112 determines that the data set has been modified and/or tampered with. In response, data verifier 112 may restore the data set to a state before the data set was not modified.

For example, data verifier 112 may periodically obtain data set(s) maintained by data store(s) 106 and provide such data set(s) to tree generator 108. Tree generator 108 generates a tree-based data structure comprising a root node storing the root hash value representative of the data set, as described above. Data verifier 112 determines whether the root hash value matches a previously-determined root hash value for the data set. If the root hash values match, a backup (or copy) of the data set is created and maintained (e.g., in data store(s) 106 or in another data store (not shown). Upon detecting a root value mismatch, data verifier 112 may restore the data set with the backup version of the data set.

Figure 2D:
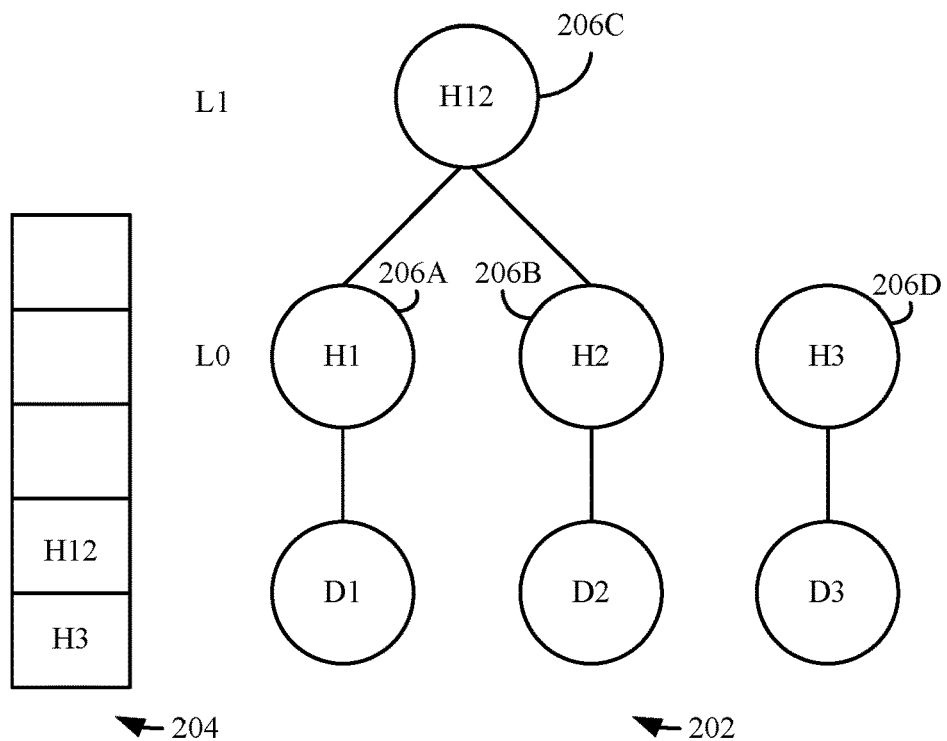
Figure 2E:
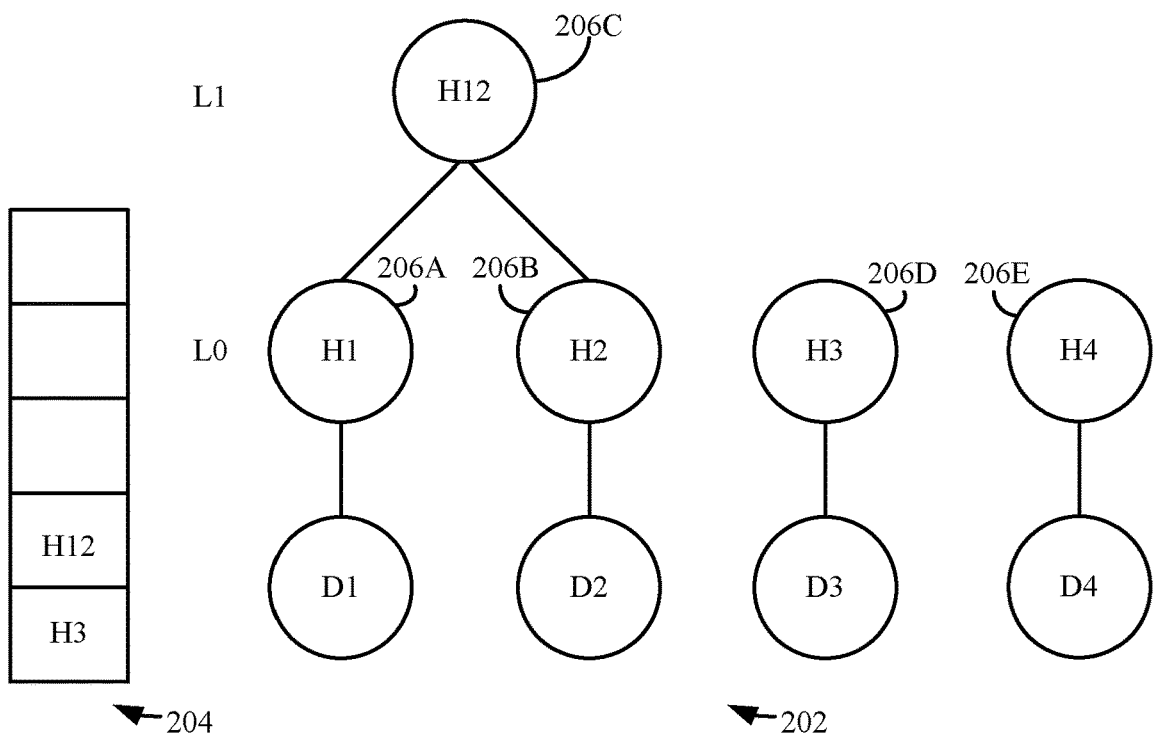
Figure 2F:
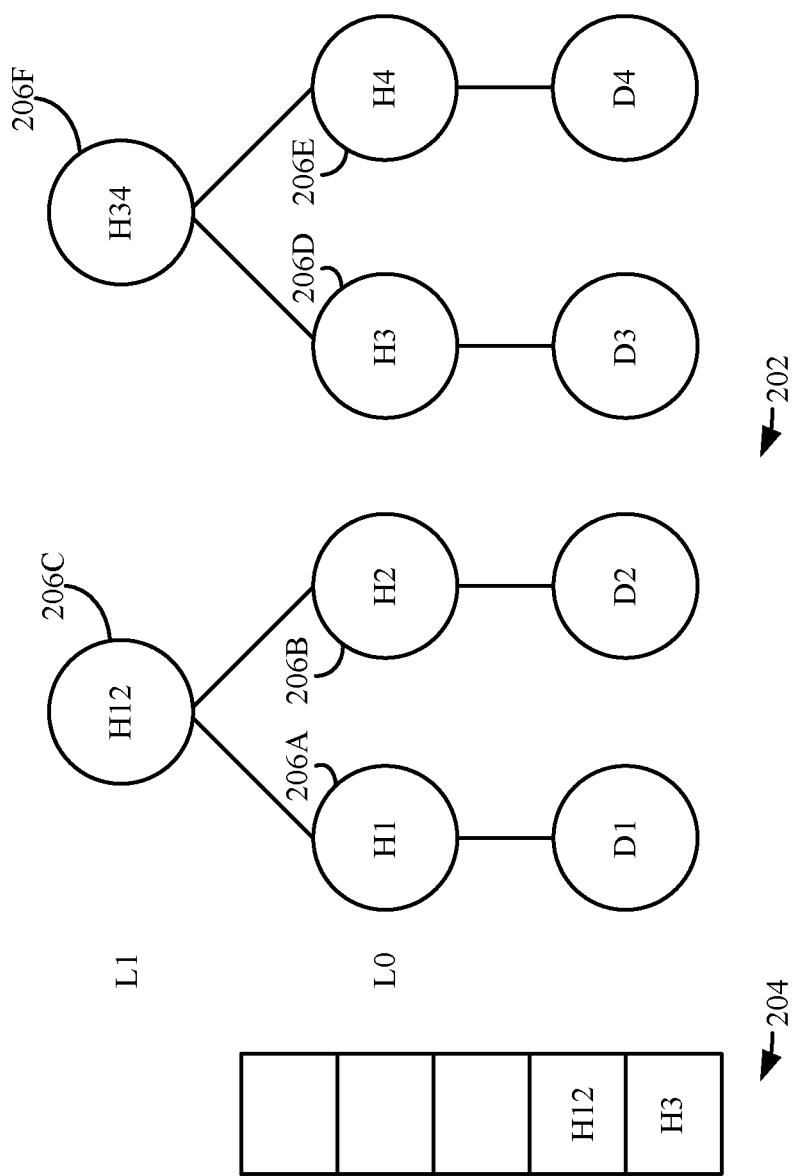
Figure 2G:
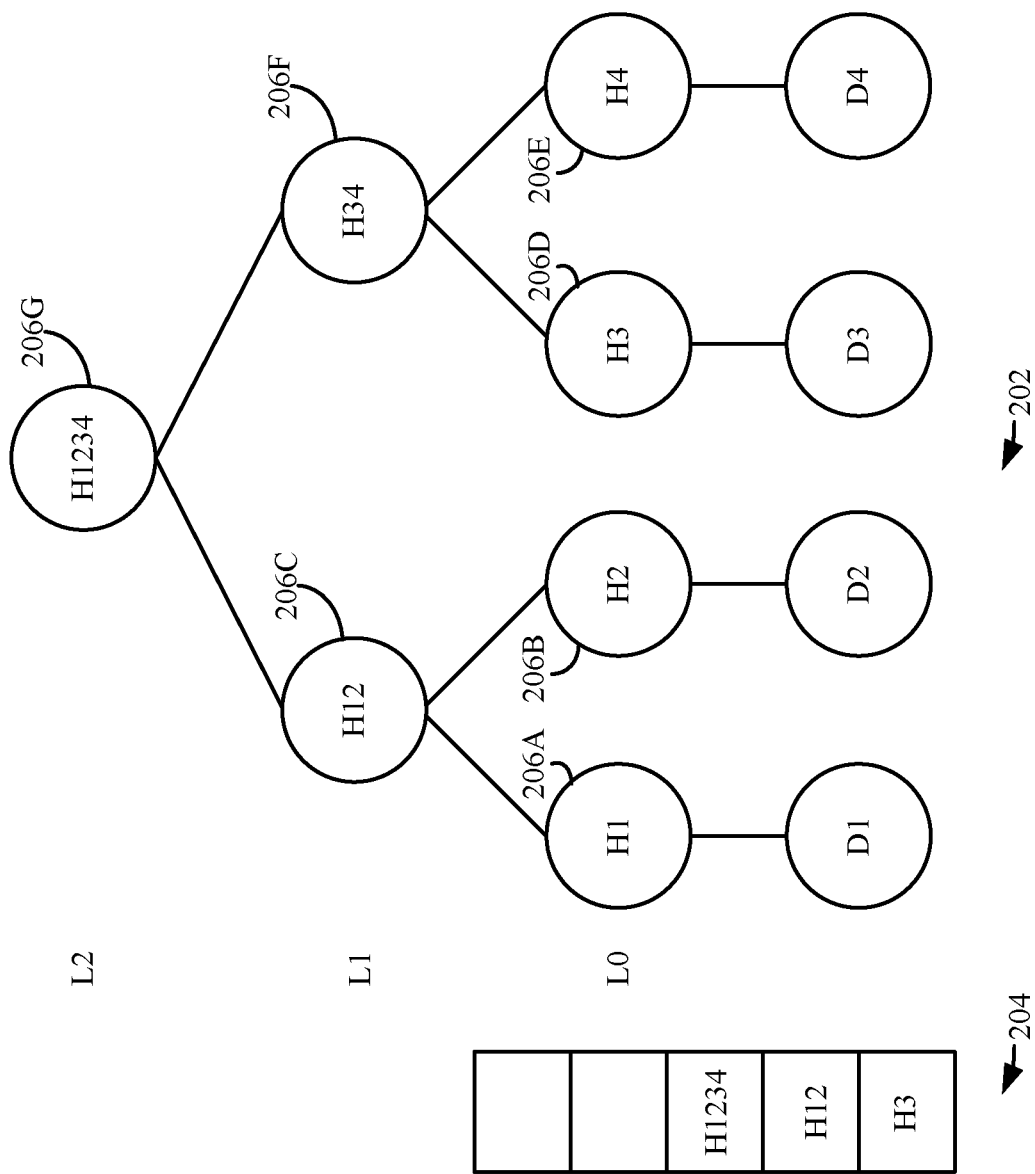
Figure 2H:
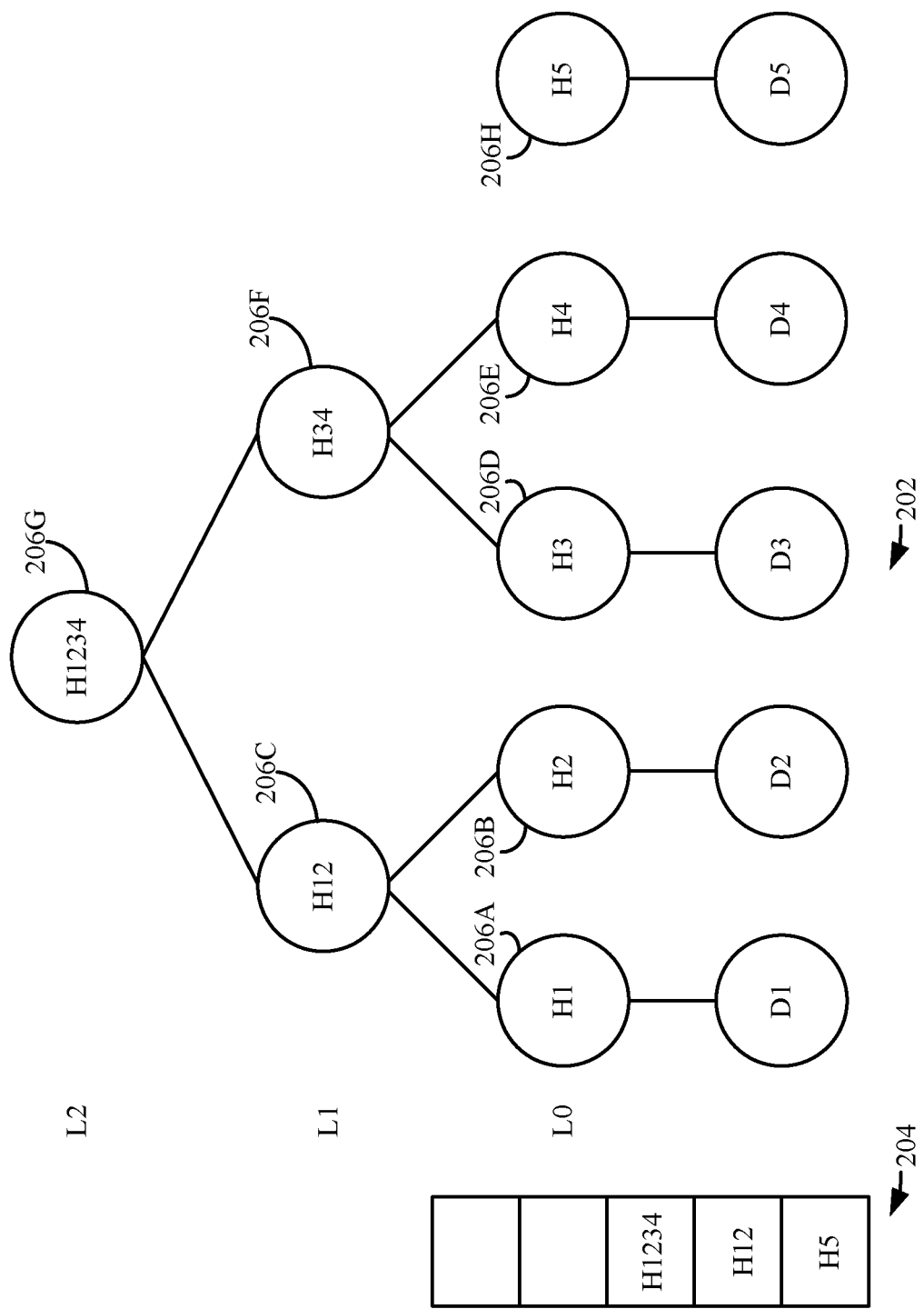

FIGS. 2A-2J depict diagrams illustrating a streaming technique utilized to generate a tree-based data structure 202 and to update a state data structure 204 for maintaining the state of tree-based data structure 202 in accordance with an example embodiment. The streaming technique will also be described with reference to a system 300. As shown in FIG. 3, system 300 comprises data store(s) 306 and a tree generator 308, which are examples of data store(s) 106 and tree generator 108, as described above with reference to FIG. 1. Tree generator 308 comprises a hash generator 310, a node generator 306, a node analyzer 309, and a state restorer 326. Hash generator 310 is an example of hash generator 110, as described above with reference to FIG. 1.

As shown in FIG. 3, hash generator 310 of tree generator 308 may receive a first notification 312A indicating that a first data item of a data set has been added and/or updated. Notification 312A may be received from transaction manager 102 or application(s) 104, as described above with reference to FIG. 1. Responsive to receiving notification 312A, hash generator 310 obtains the first data item (shown as data item 314A) corresponding to notification 312A from data store(s) 306. Hash generator 310 provides first data item 314A as an input into a hash function performed thereby, which outputs a hash value 316A based on the first data item. Node generator 312 initiates the generation of a tree-based data structure 302, by generating a leaf node at the lowest level of tree-based data structure 302 and storing hash value 316A in the leaf node. For example, as shown in FIG. 2A, node generator 312 generates a leaf node 206A at the lowest level (L0) of tree-based data structure 202. Leaf node 206 stores hash value 316A (shown as "H1") of first data item 314A (shown as "D1"). Tree-based data structure 202 is an example of tree-based data structure 302, as shown in FIG. 3.

Referring again to FIG. 3, node analyzer 309 determines whether leaf node 206A is an odd node or an even node with respect to level L0. In the example shown in FIG. 2A, leaf node 206A is an odd node. As a result, node analyzer 309 stores hash value 316A (stored in leaf node 206A (i.e., H1)) in a first element of state data structure 304. The first element corresponds to L0. For example, as shown in FIG. 2A, node analyzer 309 stores H1 in a first element of data structure 204, which is an example of data structure 304. In the example shown in FIGS. 2A-2J, state data structure 204 is an array comprising a plurality of elements, where each element corresponds to a particular level of tree-based data structure 202. However, it is noted that state data structure 204 is not limited to an array and may be other types of data structures, such as, but not limited to a linked list, a hash table, etc.

Continuing with the example above, hash generator 310 of tree generator 308 may receive a second notification 312B indicating that a second data item of the data set has been added and/or updated. Responsive to receiving notification 312B, hash generator 310 obtains the second data item (shown as data item 314B) corresponding to notification 312B from data store(s) 306. Hash generator 310 provides second data item 314B as an input into the hash function performed thereby, which outputs a hash value 316B based on the second data item. Node generator 312 generates a second leaf node at the lowest level of tree-based data structure 302 and stores hash value 316B in the leaf node. For example, as shown in FIG. 2B, node generator 312 generates a leaf node 206B at the lowest level (L0) of tree-based data structure 202. Leaf node 206B stores second hash value 316B (shown as "H2") of a first data item 314B (shown as "D2").

Referring again to FIG. 3, node analyzer 309 determines whether leaf node 206B is an odd node or an even node with respect to level L0. In the example shown in FIG. 2B, leaf node 206B is an even node. As a result, node analyzer 309 sends a command 318 to node generator 312, which generates a new node and adds the new node at the next level of tree-based data structure 302. The new node is a parent to the leaf nodes generated for data items 314A and 314B. The new node also comprises a hash value that is generated based on the hash values of data items 314A and 314B. For example, node generator 312 may retrieve hash value 316A for data item 306A from the first element of state data structure 304 and provide a command 320 to hash generator 310. Command 320 may comprise the retrieved hash value 316A and hash value 316B. Hash generator 310 inputs hash values 316A and 316B to the hash function and outputs a hash value 322A. Node generator 312 stores hash value 322A in the new node generated at the next lowest level. For example, as shown in FIG. 2C, node generator 312 generates a node 206C at the next lowest level (i.e. L1), which is a parent to nodes 206A and 206B. Node 206C stores hash value 322A (shown as "H12"), which is a hash value based on the hash values stored by node 206A (as retrieved from the first element of state data structure 204) and node 206B.

Now that a node 206C is generated at L1, node analyzer 309 determines whether node 206C is an odd or even node. In the example shown in FIG. 2C, node 206C is an odd node. As a result, node analyzer 309 stores hash value 322A stored in leaf node 206C (i.e., H12) in a second element of data structure 304. The second element corresponds to L1. For example, as shown in FIG. 2C, node analyzer 309 stores H12 in a second element of data structure 204.

Continuing with the example above, hash generator 310 of tree generator 308 may receive a third notification 312C indicating that a third data item of the data set has been added and/or updated. Responsive to receiving notification 312C, hash generator 310 obtains the third data item (shown as data item 314C) corresponding to notification 312C from data store(s) 306. Hash generator 310 provides third data item 314C as an input into the hash function performed thereby, which outputs a hash value 316C based on the third data item. Node generator 312 generates a third leaf node at the lowest level of tree-based data structure 302 and stores hash value 316C in the leaf node. For example, as shown in FIG. 2D, node generator 312 generates a leaf node 206D at the lowest level (L0) of tree-based data structure 202. Leaf node 206D stores third hash value 316C (shown as "H3") of third data item 314C (shown as "D3").

Referring again to FIG. 3, node analyzer 309 determines whether leaf node 206D is an odd node or an even node with respect to level L0. In the example shown in FIG. 2D, leaf node 206D is an odd node. As a result, node analyzer 309 stores hash value 316C stored in leaf node 206D (i.e., H3) in the first element of data structure 304 (i.e., the previous value stored therein is overwritten with hash value 316C). For example, as shown in FIG. 2D, node analyzer 309 stores H3 in the first element of data structure 204.

Continuing with the example above, hash generator 310 of tree generator 308 may receive a fourth notification 312D indicating that a fourth data item of the data set has been added and/or updated. Responsive to receiving notification 312D, hash generator 310 obtains the fourth data item (shown as data item 314D) corresponding to notification 312D from data store(s) 306. Hash generator 310 provides fourth data item 314D as an input into the hash function performed thereby, which outputs a hash value 316D based on the fourth data item. Node generator 312 generates a fourth leaf node at the lowest level of tree-based data structure 302 and stores hash value 316D in the leaf node. For example, as shown in FIG. 2E, node generator 312 generates a leaf node 206E at the lowest level (L0) of tree-based data structure 202. Leaf node 206E stores hash value 316D (shown as "H4") of first data item 314D (shown as "D4").

Referring again to FIG. 3, node analyzer 309 determines whether leaf node 206E is an odd node or an even node with respect to level L0. In the example shown in FIG. 2E, leaf node 206E is an even node. As a result, node analyzer 309 sends command 318 to node generator 312, which generates a new node and adds the new node at the next lowest level of tree-based data structure 302 (i.e. L1). The new node is a parent to the leaf nodes generated for data items 314C and 314D. The new node also comprises a hash value that is generated based on the hash values of data items 314C and 314D. For example, node generator 312 may retrieve hash value 316C for data item 314C from the first element of data structure 304 and provide command 320 to hash generator 310. Command 320 may comprise the retrieved hash value 316C and hash value 316D. Hash generator 310 inputs hash values 316C and 316D to the hash function and outputs a hash value 322B. Node generator 312 stores hash value 322B in the new node generated at the next lowest level. For example, as shown in FIG. 2F, node generator 312 generates a node 206F at the next lowest level (i.e. L1), which is a parent to nodes 206D and 206E. Node 206F stores hash value 322B (shown as "H34"), which is a hash value based on the hash values stored by node 206D (and retrieved from the first element of data structure 204) and node 206E.

Now that a node 206F is generated at L1, node analyzer 309 determines whether node 206F is an odd or even node. In the example shown in FIG. 2F, node 206F is an even node. As a result, node analyzer 309 sends command 318 to node generator 312, which generates a new node and adds the new node at the next lowest level of tree-based data structure 302 (i.e. L2). The new node is a parent to nodes 206C and 206F. The new node also comprises a hash value that is generated based on the hash values of nodes 206C and 206F (i.e., H12 and H34). For example, node generator 312 may retrieve hash value 322A (i.e., H12) for node 206C from the second element of state data structure 304 and provide command 320 to hash generator 310. Command 320 may comprise the retrieved hash value 322A and hash value 322B. Hash generator 310 inputs hash values 322A and 322B to the hash function and outputs a hash value 324A. Node generator 312 stores hash value 324A in the new node generated at the next lowest level. For example, as shown in FIG. 2G, node generator 312 generates a node 206G at the next lowest level (i.e. L2), which is a parent to nodes 206C and 206F. Node 206G stores hash value 324A (shown as "H1234"), which is a hash value based on the hash values stored by node 206C (as retrieved from the second element of data structure 204) and node 206F.

Now that node 206G is generated at L2, node analyzer 309 determines whether node 206G is an odd or even node. In the example shown in FIG. 2G, node 206G is an odd node. As a result, node analyzer 309 stores hash value 324A stored in leaf node 206G (i.e., H1234) and stores hash value 324A in a third element of data structure 304. The third element corresponds to L2. For example, as shown in FIG. 2G, node analyzer 309 stores H1234 in a third element of data structure 204.

Continuing with the example above, hash generator 310 of tree generator 308 may receive a fifth notification 312E indicating that a fifth data item of the data set has been added and/or updated. Responsive to receiving notification 312E, hash generator 310 obtains the fifth data item (shown as data item 314E) corresponding to notification 312E from data store(s) 306. Hash generator 310 provides fifth data item 314E as an input into the hash function performed thereby, which outputs a hash value 316E based on the fifth data item. Node generator 312 generates a fifth leaf node at the lowest level of tree-based data structure 302 and stores hash value 316E in the leaf node. For example, as shown in FIG. 2H, node generator 312 generates a leaf node 206H at the lowest level (L0) of tree-based data structure 202. Leaf node 206H stores hash value 316E (shown as "H5") of a fifth data item 314E (shown as "D5").

Referring again to FIG. 3, node analyzer 309 determines whether leaf node 206H is an odd node or an even node with respect to level L0. In the example shown in FIG. 2H, leaf node 206H is an odd node. As a result, node analyzer 309 stores hash value 316E stored in leaf node 206H (i.e., H5) in the first element of data structure 304 (i.e., the previous value stored therein is overwritten with hash value 316E). For example, as shown in FIG. 2H, node analyzer 309 stores H5 in the first element of data structure 204.

In the example above, data item 314E is the final data item to be updated and/or added. After a leaf node for the final data item is generated, tree generator 308 completes tree-based data structure 302 until all leaf nodes are associated with the same root node. As shown in FIG. 2H, leaf node 206H does not have a sibling. Therefore, leaf node 206H itself is promoted as its parent. For instance, node generator 312 may generate one or more null (or dummy) nodes to complete tree-based data structure 300.

Figure 2I:
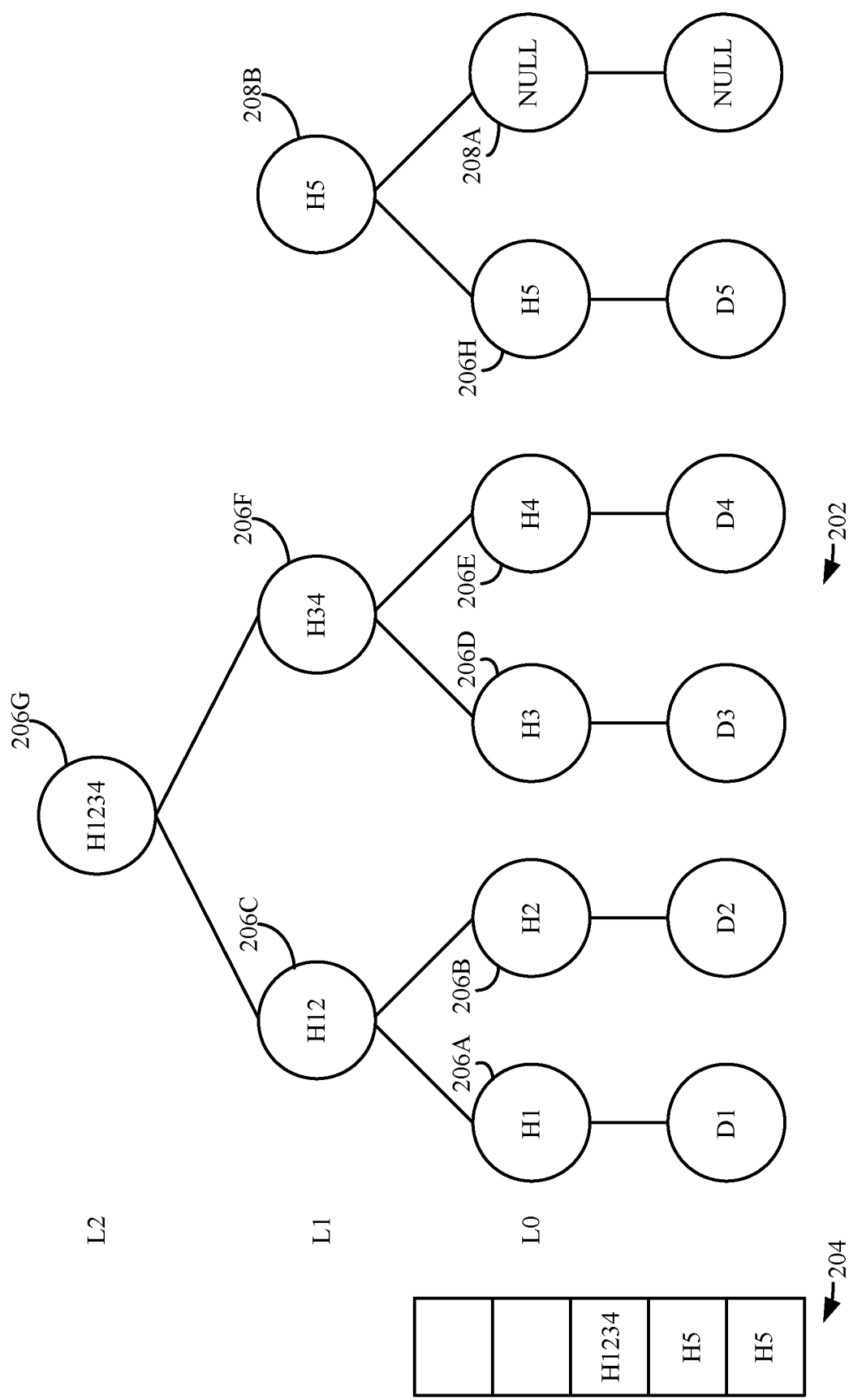
Figure 3:
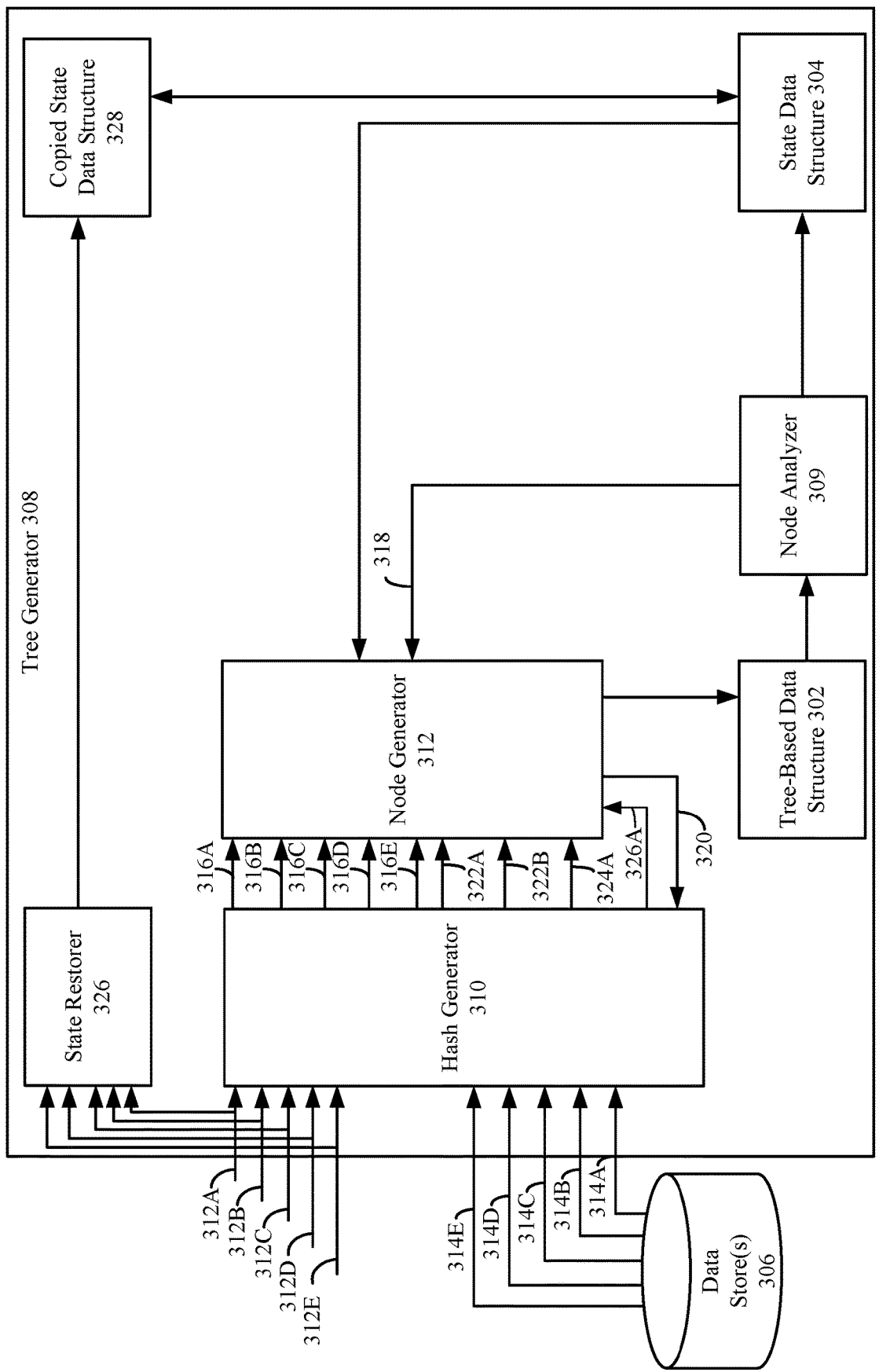
FIG. 3 depicts a plurality of event records in accordance with an example embodiment.

For example, as shown in FIG. 2I, node generator 312 generates null node 208A at level L0, such that node 206H now has a sibling. Now that node 208A is generated at L0, node analyzer 309 determines whether node 208A is an odd or even node. In the example shown in FIG. 2H, node 208A is an even node. As a result, node analyzer 309 sends command 318 to node generator 312, which generates a new node and adds the new node at the next lowest level of tree-based data structure 302 (i.e. L1). The new node is a parent to the leaf node generated for data item 206H and null node 208A. The new node also comprises the hash value of node 206H (i.e., H5) (thereby promoting node 206H to a parent node). For example, node generator 312 may retrieve hash value 316E for data item 306E from the first element of data structure 304 and stores hash value 316E in the new node generated at the next lowest level. For example, as shown in FIG. 2I, node generator 312 generates a node 208B at the next lowest level (i.e. L1), which is a parent to nodes 206H and 208A. Node 208B stores hash value 316E (shown as "H5"), which is the same hash value stored by node 206H.

Now that node 208B is generated at L1, node analyzer 309 determines whether node 208B is an odd or even node. In the example shown in FIG. 2I, node 208B is an odd node. As a result, node analyzer 309 stores hash value 316E stored in node 208B (i.e., H5) in the second element of data structure 304. For example, as shown in FIG. 2I, node analyzer 309 stores H5 in the second element of data structure 204.

Figure 2J:
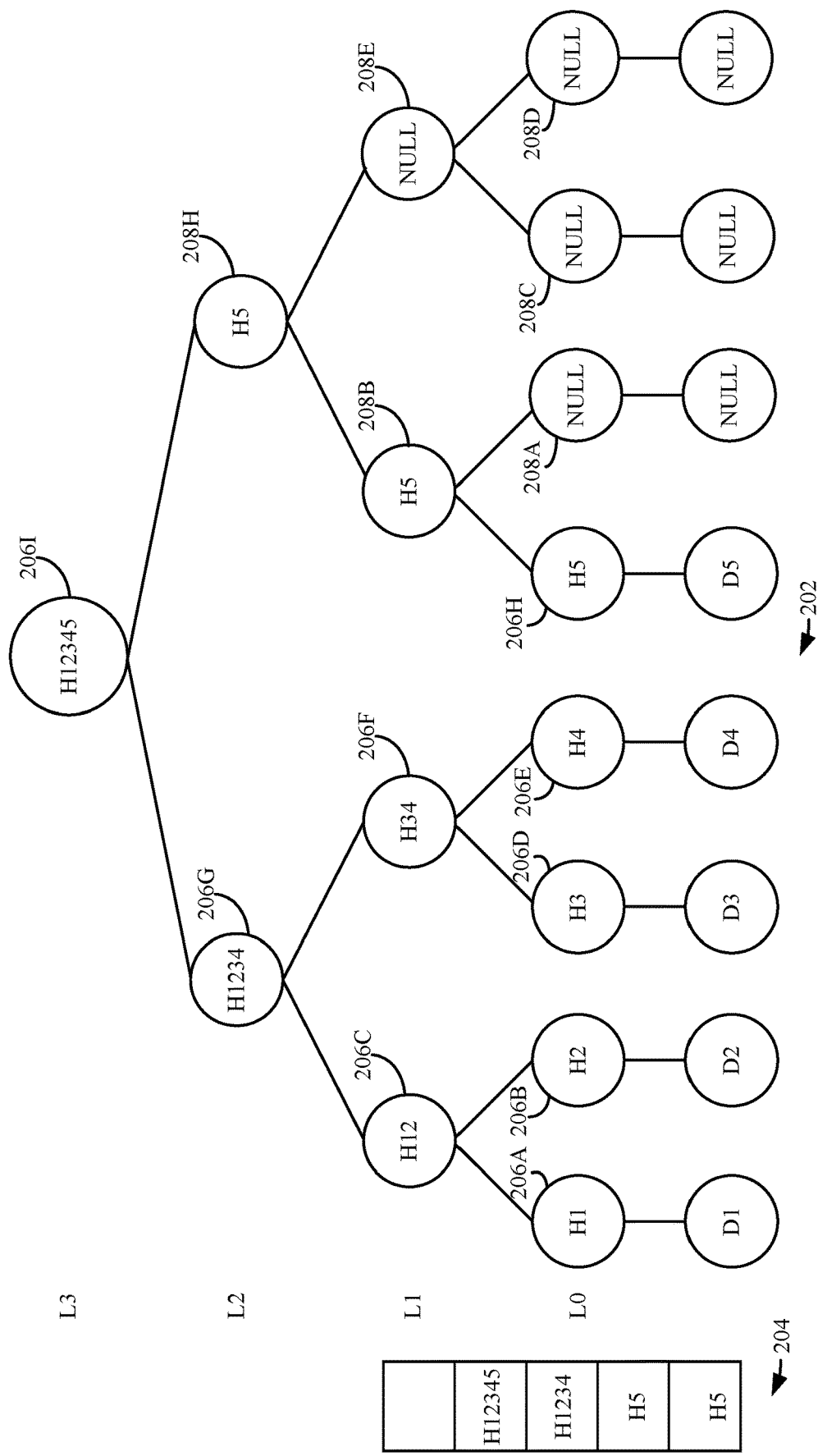

Node generator 312 continues to perform the aforementioned operations until the leaf nodes are associated with a common root node. For example, as shown in FIG. 2J, node generator 312 has generated null node 208E, which is a sibling to node 208B. Any node under node 208B is also a null node. As shown in FIG. 2J, nodes 208C and 208D are logically added to tree structure 202. After generating node 208D, node generator 312 determines that node 208D is an even node, and therefore, generates null node 208E at level L1. Because null node 208E is an even node at level L1, node generator 312 sends command 318 to node generator 312, which generates a new node and adds the new node at the next lowest level of tree-based data structure 302 (i.e. L2). The new node is a parent to the nodes 208B and 208E. The new node also comprises the hash value of node 208B (i.e., H5). For example, node generator 312 may retrieve hash value 316E for data item 306E from the second element of data structure 304 and stores hash value 316E in the new node generated at the next lowest level. For example, as shown in FIG. 2J, node generator 312 generates a node 206H at the next lowest level (i.e. L2), which is a parent to nodes 208B and 208E. Node 206H stores hash value 316E (shown as "H5"), which is the same hash value stored by nodes 206H and 208B.

Now that node 208H is generated at L2, node analyzer 309 determines whether node 206H is an odd or even node. In the example shown in FIG. 2J, node 206H is an even node. As a result, node analyzer 309 sends command 318 to node generator 312, which generates a new node and adds the new node at the next lowest level of tree-based data structure 302 (i.e. L3). The new node is a parent to nodes 206G and 206H. The new node also comprises a hash value that is generated based on the hash values stored in nodes 206G and 206H. For example, node generator 312 may retrieve hash value 324A from the third element of data structure 304 and provide a command 320 to hash generator 310. Command 320 may comprise the retrieved hash value 324A and hash value 316E. Hash generator 310 inputs hash values 324A and 316E to the hash function and outputs a hash value 326A. Node generator 312 stores hash value 326A in the new node generated at the next lowest level. For example, as shown in FIG. 2J, node generator 312 generates node 206I at the next lowest level (i.e. "L3"), which is a parent to nodes 206G and 206H. Node 206I stores hash value 326A (shown as "H12345"), which is a hash value based on the hash values stored by node 206G (as retrieved from the third element of data structure 204) and node 206H.

As shown in FIG. 2J, node 206I is a common root node for all leaf nodes 206A, 206B, 206D, 206E, and 206H. Accordingly, node 206I is determined to be the root node of tree-based data structure 202. The hash value stored by node 206I (hash value 326A) is the root hash value that is representative of all the data items (i.e., data items 314A-314E) added and/or updated with respect to a particular data set.

It is noted that while the example described above is with respect to five data items, any number of data items may be added and/or updated with respect to a particular data set, and that tree-based data structure 202 and 302 may comprise any number of nodes representative of such data items.

In an embodiment in which data items are rows of a table and operations that update or add rows of the table are database operations, one or more of the operations may comprise a savepoint. The savepoint indicates a point within a transaction (configured to update or add multiple rows) that can be rolled back to without affecting any work done in the transaction before the save point was created. A savepoint may be declared in a transaction via a SAVEPOINT statement. All changes made after a savepoint has been declared can be undone via a ROLLBACK TO SAVEPOINT command.

In embodiments, tree generator 308 is configured to determine whether a transaction comprises a savepoint and/or a rollback command. In response to determining that a transaction comprises a savepoint, tree generator 308 generates a copy of state data structure 304, thereby preserving the logarithmic state of tree-based data structure 302 at the time of the savepoint. In the event that a rollback command is detected, tree generator 308 may bring the tree-based data structure 302 back to the state it had when the savepoint was created by using the values stored in the copied state data structure 304.

For instance, as shown in FIG. 3, each of notifications 312A-312E may also indicate whether the transaction corresponding thereto comprises a savepoint or rollback command. Each of notifications 312A-312E are provided to state restorer 326, which determines whether notifications 312A-312E comprise a savepoint or rollback command. In response to determining that a notification of notifications 312A-312E comprises a savepoint, state restorer 326 saves the values stored in state data structure 304. For instance, state restorer 326 may generate a copy of state data structure (shown as copied state data structure 328). In an example, suppose that notification 312D specifies that its corresponding transaction comprises a savepoint. In this example, with reference to FIG. 2G, the values stored in data structure 204 (after leaf node 206E is added for data item 314B and node 206G is generated in tree-based data structure 202 (e.g., H3, H12, and H1234)) are saved and/or stored in copied state data structure 328.

In the event that state restorer 326 determines that a subsequent transaction comprises a rollback command, state restorer 326 rolls back tree-based data structure 302 in accordance with the values stored in copied state data structure 328. For example, state restorer 326 may cause the values stored in copied state data structure 328 to be copied to state data structure 304, which effectively causes tree-based data structure 302 to be restored to the state shown in FIG. 2G.

It is noted that while tree generator 308 is described as generating a binary tree, such as a Merkle tree, the embodiments described herein are not so limited. For instance, tree generator 308 may be configured to generate other tree structures in which a parent node may have more than two child nodes. In such embodiments, the hash value stored by the parent may be based on the hash values of all of its child nodes.

Figure 4:
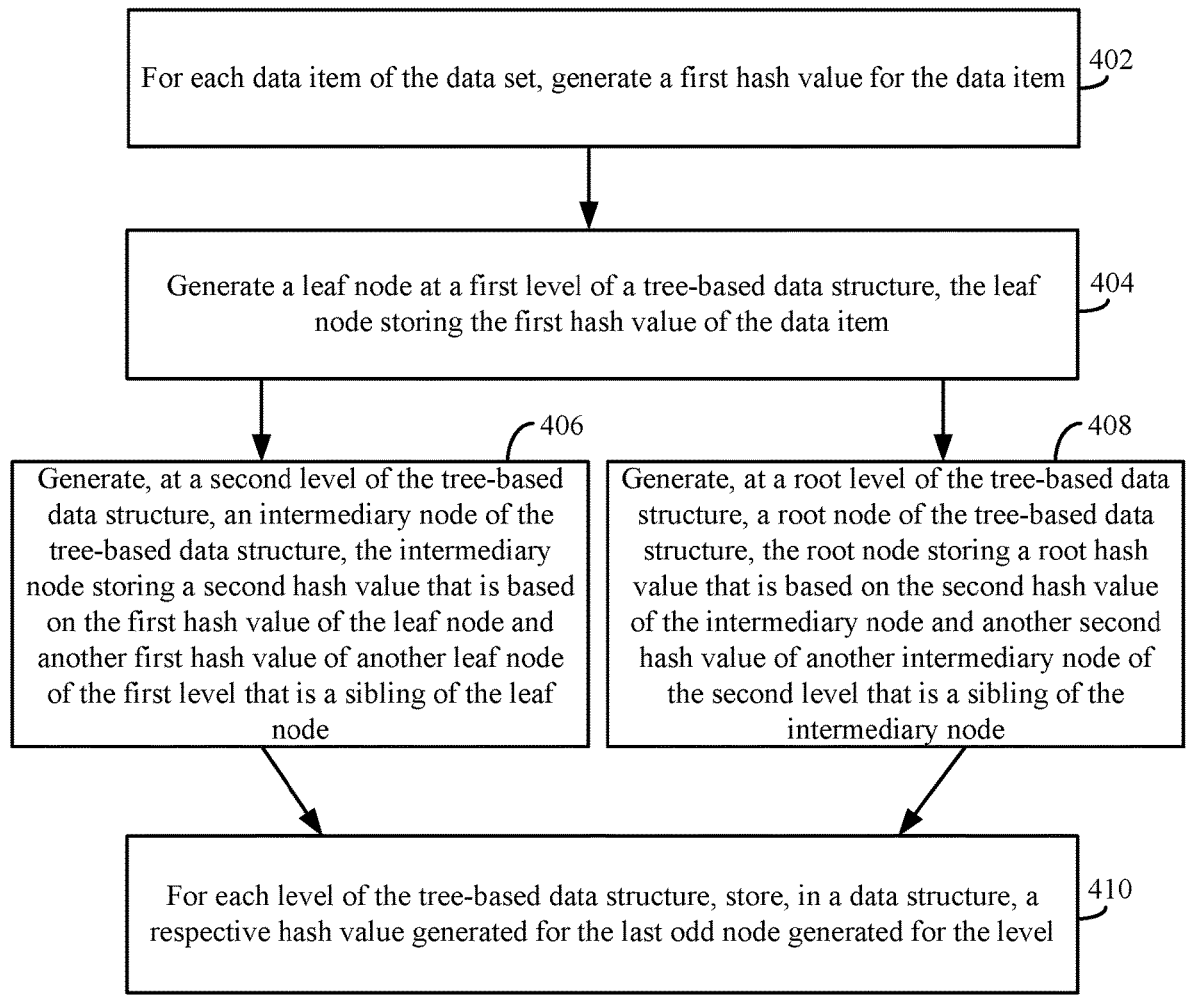
FIG. 4 shows a flowchart of a method for generating a tree-based data structure representative of a data set in accordance with an example embodiment.

Accordingly, a tree-based data structure representative of a data set may be generated in many ways. For example, FIG. 4 shows a flowchart 400 of a method for generating a tree-based data structure representative of a data set in accordance with an example embodiment. In an embodiment, flowchart 400 may be implemented by system 300 shown in FIG. 3, although the method is not limited to that implementation. Accordingly, flowchart 400 will be described with reference to FIG. 3. Other structural and operational embodiments will be apparent to persons skilled in the relevant art(s) based on the discussion regarding flowchart 400 and system 300 of FIG. 3.

Flowchart 400 begins with step 402. In step 402, for each data item of the data set, a first hash value for the data item is generated. For example, with reference to FIG. 3, hash generator 310 generates hash values 316A-316E for each of data items 314A-314E, respectively. Hash generator 310 generates hash values 316A-316E responsive to receiving respective notifications 312A-312E.

In step 404, for each data item of the data set, a leaf node at the first level of a tree-based data structure is generated. The leaf node stores the first hash value of the data item. For example, with reference to FIG. 3, node generator 312 generates a leaf node at the first level of tree-based data structure 302 for each of data items 314A-314E. Each leaf node stores a respective hash value of hash values 316A-316E. For instance, as shown in FIG. 2B, leaf nodes 206A and 206B are generated at level L0 of tree-based data structure 202. Leaf node 206A stores first hash value 316A (shown as "H1"), and leaf node 206B stores first hash value 316B (shown as "H2").

Responsive to determining that the leaf node is an even node with respect to the first level, at least one of steps step 406 and 408 are performed. In step 406, at a second level of the tree-based data structure, an intermediary node of the tree-based data structure is generated, the intermediary node storing a second hash value that is based on the first hash value of the leaf node and another first hash value of another leaf node of the first level that is sibling of the leaf node. For example, with reference to FIG. 3, node generator 312 generates an intermediary node of tree-based data structure 302 at an intermediary level thereof. The intermediary node stores a second hash value that is based on the first hash value of the leaf node and another first hash value of another leaf node of the first level. For example, with reference to FIGS. 2C and 3, node generator 312 generates intermediary node 206C at L1. Intermediary node 206C stores a second hash value (e.g., second hash value 322A), which is based on first hash value 316A (shown as "H1") stored in leaf node 206A and first hash value 316B (shown as "H2") stored in leaf node 206B.

In step 408, at a root level of the tree-based data structure, a root node of the tree-based data structure is generated, the root node storing a root hash value that is based on the second hash value of the intermediary node and another second hash value of another intermediary node of the second level that is a sibling of the intermediary node. For example, with reference to FIG. 3, node generator 312 generates a root node of tree-based data structure 302 at a root level thereof. The root node stores a root hash value that is based on the second hash value of the intermediary node and another second hash value of another intermediary node of the first second. For example, with reference to FIGS. 2G and 3, node generator 312 generates root node 206G at L2. Root node 206G stores a root hash value (e.g., third hash value 324A), which is based on second hash value 322A (shown as "H12") stored in intermediary node 206C and second hash value 322B (shown as "H34") stored in intermediary node 206F.

In step 410, for each level of the tree-based data structure, a respective hash value generated for the last odd node generated for the level is stored in a data structure. For example, with reference to FIG. 3, for each level of tree-based data structure 302, state data structure 304 stores a respective hash value generated for the last odd node generated for the level. For example, as shown in FIG. 2J, state data structure 204 stores the hash value of leaf node 206H (which was the last odd node generated for L0) in a first element thereof, state data structure 204 stores the hash value of intermediary node 208B (which was the last odd node generated for L1) in a second element thereof, state data structure 204 stores the hash value of intermediary node 206G (which was the last odd node generated for L2) in a third element thereof, and state data structure 204 stores the hash value of root node 206I (which was the last odd node generated for L3) in a fourth element thereof.

In accordance with one or more embodiments, the tree-based data structure is a Merkle tree.

In accordance with one or more embodiments, the data set is a ledger of transactions utilized in a block chain.

In accordance with one or more embodiments, a determination is made that that a transaction with respect to a particular data item of the data set comprises a savepoint, and in response to such a determination, the hash values stored in the data structure are copied. For example, with reference to FIG. 3, state restorer 326 may determine that a particular transaction corresponding to one of notifications 312A-312E comprises a savepoint. In response, state restorer 326 copies the values in state data structure 304 into another data structure (e.g., copied state data structure 328).

In accordance with one or more embodiments, a request to roll back to the savepoint is detected, and in response to such detection, the tree-based data structure is restored in accordance with the copied hash values. For example, with reference to FIG. 3, state restorer 326 may determine that a subsequent transaction comprises a rollback command. In response, state restorer 326 restores tree-based data structure 302 in accordance with the values stored in copied state data structure 328. For instance, the values stored in copied state data structure 328 may be copied to state data structure 304.

Figure 5:
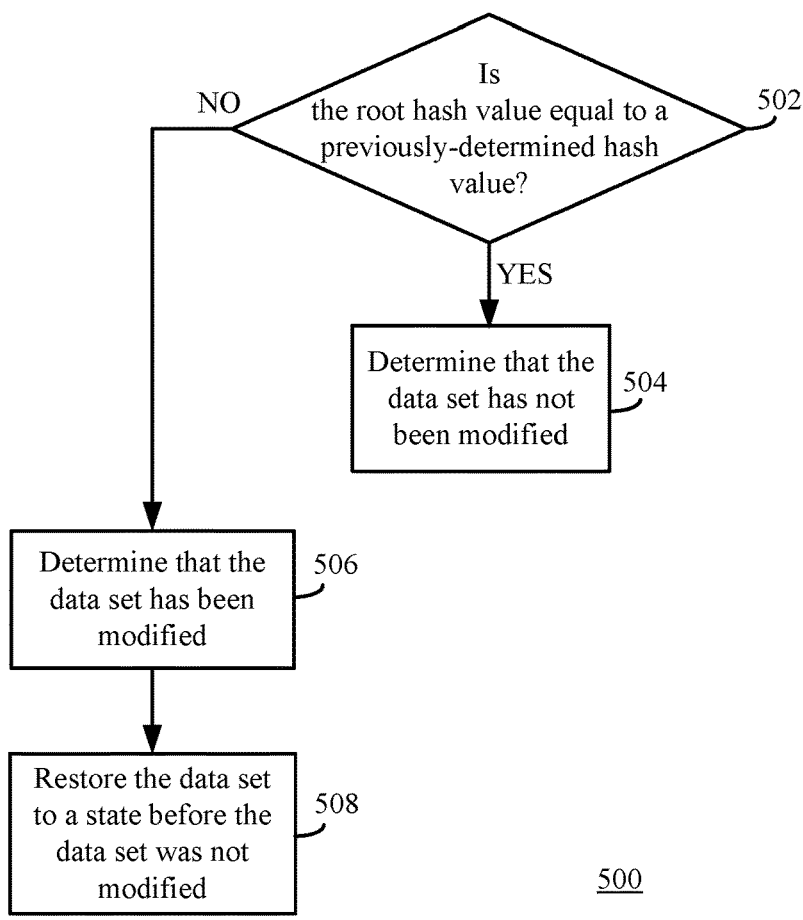
FIG. 5 shows a flowchart of a method for verifying a data set utilizing a tree-based data structure in accordance with an example embodiment.

FIG. 5 shows a flowchart 500 of a method for verifying a data set utilizing a tree-based data structure in accordance with an example embodiment. In an embodiment, flowchart 500 may be implemented by system 100 shown in FIG. 1, although the method is not limited to that implementation. Accordingly, flowchart 500 will be described with continued reference to FIG. 1. Other structural and operational embodiments will be apparent to persons skilled in the relevant art(s) based on the discussion regarding flowchart 500 and system 100 of FIG. 1.

Flowchart 500 begins with step 502. In step 502, the root hash value is compared to a previously-determined hash value for the data set. If a determination is made that the root hash value is equal to the previously-determined hash value, flow continues to step 504. Otherwise, flow continues to step 510. For example, with reference to FIG. 1, data verifier 112 may obtain the root hash value from the tree-based data structure generated by tree generator 108 (e.g., tree-based data structure 302) and compare the root hash value to a previously-determined hash value for the data set.

In step 504, a determination is made that the data set has not been modified. For example, with reference to FIG. 1, data verifier 112 determines that the data set maintained by data store(s) 106 has not been modified.

In step 506, a determination is made that the data set has been modified. For example, with reference to FIG. 1, data verifier 112 determines that the data set has been modified.

In step 508, the data set is restored to a state before the data set was not modified. For example, with reference to FIG. 1, data verifier 112 may restore the data set to a state before it was modified. For example, data verifier 112 may retrieve a backup of the data set (e.g., maintained by data store(s) 106).

Figure 6:
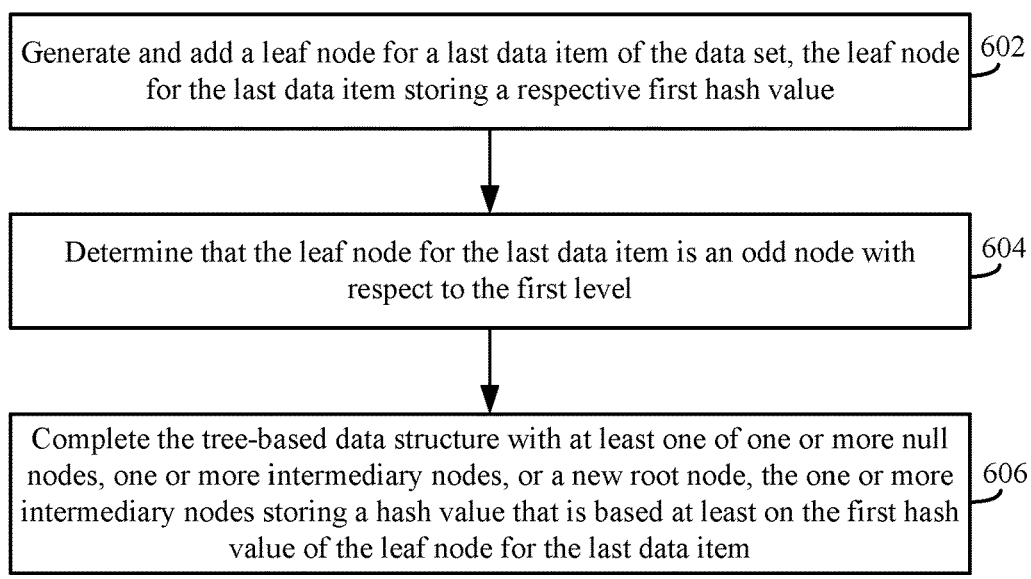
FIG. 6 shows a flowchart of a method for completing a tree-based data structure in accordance with an example embodiment.

FIG. 6 shows a flowchart 600 of a method for completing a tree-based data structure in accordance with an example embodiment. In an embodiment, flowchart 600 may be implemented by system 300 shown in FIG. 3, although the method is not limited to that implementation. Accordingly, flowchart 600 will be described with continued reference to FIG. 3. Other structural and operational embodiments will be apparent to persons skilled in the relevant art(s) based on the discussion regarding flowchart 600 and system 300 of FIG. 3.

Flowchart 600 begins with step 602. In step 602, a last node for a last data item of the data set is generated. The leaf node for the last data item stores a respective first hash value. For example, with reference to FIG. 3, node generator 312 generates a last node for a last data item of the data set. For instance, as shown in FIG. 2H, leaf node 206H represents the node generated for last data item 314E.

In step 604, a determination is made that the leaf node for the last data item is an odd node with respect to the first level. For example, with reference to FIG. 3, node analyzer 309 determines that the leaf node (e.g., leaf node 206H) is an odd node with respect to L0.

In step 606, the tree-based data structure is completed with at least one of one or more null nodes, one or more intermediary nodes, or a new root node, the one or more intermediary nodes storing a hash value that is based at least on the first hash value of the leaf node for the last data item. For example, with reference to FIG. 3, node generator 312 completes the tree-based data structure with at least one of one or more null nodes, one or more intermediary nodes, or a new root node. For example, as shown in FIGS. 2I and 2J, node generator 312 generates null nodes 208A, 208C, 208D, and 208E, generates new intermediary nodes 208B and 206H (which store the hash value generated for the last leaf node 206H), and generates new root node 206I. Root node 206J stores a hash value that is representative of the nodes 206A, 206B, 206D, 206E, and 206H.

III. Example Computer System Implementation

The systems and methods described above in reference to FIGS. 1-6, may be implemented in hardware, or hardware combined with one or both of software and/or firmware. For example, system 700 of FIG. 7 may be used to implement any of transaction manager 102, application(s) 104, data store(s) 106, tree generator 108, hash generator 110, data verifier 112, tree-based data structure 202, data structure 204, tree generator 308, data store(s) 306, state restorer 326, hash generator 10, node generator 312, node analyzer 309, tree-based data structure 302, state data structure 304, copied state data structure 328, and/or any of the components respectively described therein, and/or each of the components described therein, and flowcharts 400, 500, and/or 600 may be each implemented as computer program code/instructions configured to be executed in one or more processors and stored in a computer readable storage medium. Alternatively, any of transaction manager 102, application(s) 104, data store(s) 106, tree generator 108, hash generator 110, data verifier 112, tree-based data structure 202, data structure 204, tree generator 308, data store(s) 306, state restorer 326, hash generator 10, node generator 312, node analyzer 309, tree-based data structure 302, state data structure 304, copied state data structure 328, and/or any of the components respectively described therein, and/or each of the components described therein, and flowcharts 400, 500, and/or 600 may be implemented as hardware logic/electrical circuitry. In an embodiment, any of transaction manager 102, application(s) 104, data store(s) 106, tree generator 108, hash generator 110, data verifier 112, tree-based data structure 202, data structure 204, tree generator 308, data store(s) 306, state restorer 326, hash generator 10, node generator 312, node analyzer 309, tree-based data structure 302, state data structure 304, copied state data structure 328, and/or any of the components respectively described therein, and/or each of the components described therein, and flowcharts 400, 500, and/or 600 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 7:
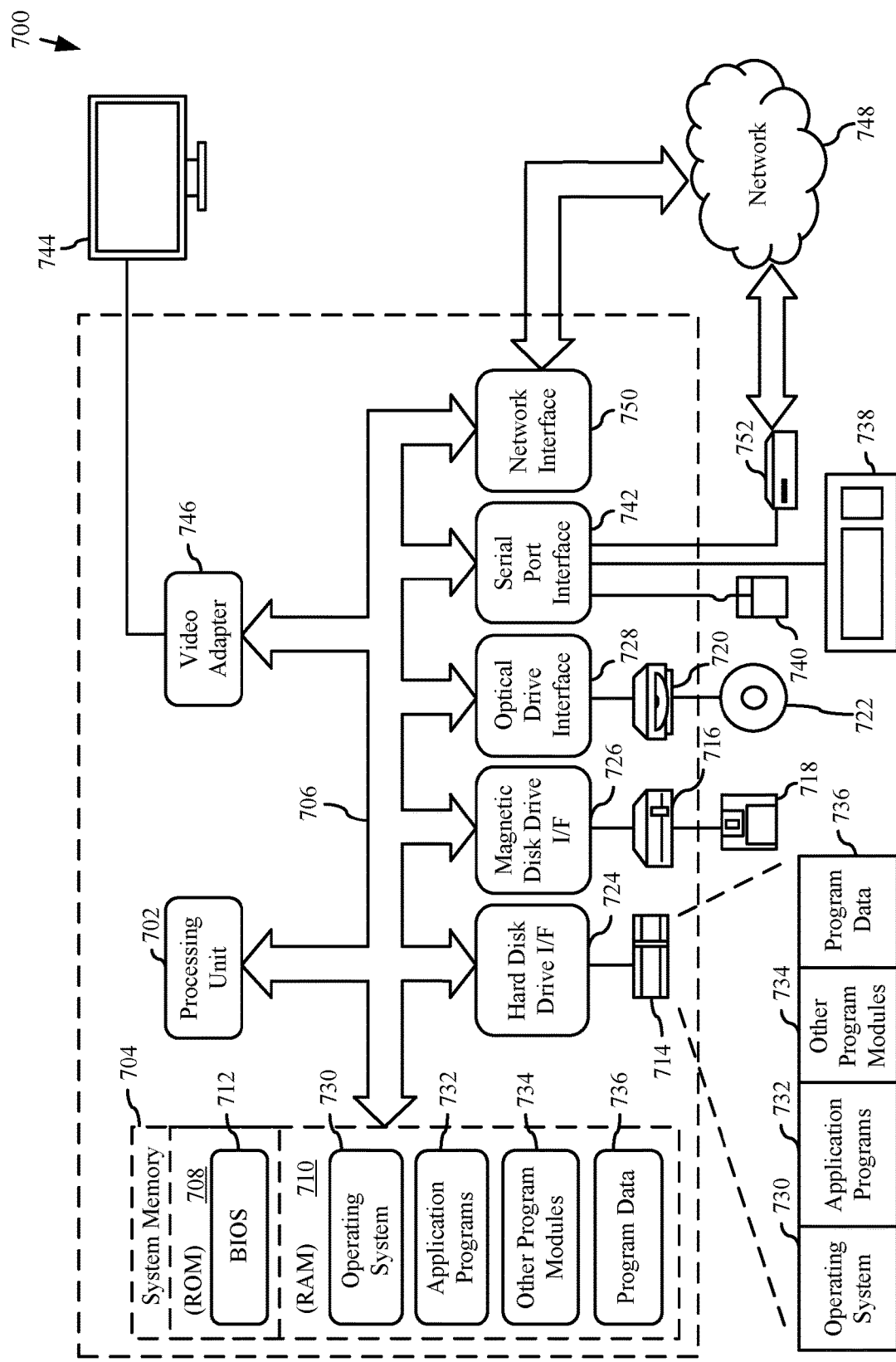
FIG. 7 is a block diagram of an example processor-based computer system that may be used to implement various embodiments.

FIG. 7 depicts an exemplary implementation of a computing device 700 in which embodiments may be implemented, including any of transaction manager 102, application(s) 104, data store(s) 106, tree generator 108, hash generator 110, data verifier 112, tree-based data structure 202, data structure 204, tree generator 308, data store(s) 306, state restorer 326, hash generator 10, node generator 312, node analyzer 309, tree-based data structure 302, state data structure 304, copied state data structure 328, and/or any of the components respectively described therein, and/or each of the components described therein, and flowcharts 400, 500, and/or 600. The description of computing device 700 provided herein is provided for purposes of illustration, and is not intended to be limiting. Embodiments may be implemented in further types of computer systems, as would be known to persons skilled in the relevant art(s).

As shown in FIG. 7, computing device 700 includes one or more processors, referred to as processor circuit 702, a system memory 704, and a bus 706 that couples various system components including system memory 704 to processor circuit 702. Processor circuit 702 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 702 may execute program code stored in a computer readable medium, such as program code of operating system 730, application programs 732, other programs 734, etc. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random access memory (RAM) 710. A basic input/output system 712 (BIOS) is stored in ROM 708.

Computing device 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 730, one or more application programs 732, other programs 734, and program data 736. Application programs 732 or other programs 734 may include, for example, computer program logic (e.g., computer program code or instructions) for implementing the systems described above, including the embodiments described above with reference to FIGS. 1-6.

A user may enter commands and information into the computing device 700 through input devices such as keyboard 738 and pointing device 740. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 702 through a serial port interface 742 that is coupled to bus 706, but may be connected by other interfaces, such as a parallel port, game port, or a universal serial bus (USB).

A display screen 744 is also connected to bus 706 via an interface, such as a video adapter 746. Display screen 744 may be external to, or incorporated in computing device 700. Display screen 744 may display information, as well as being a user interface for receiving user commands and/or other information (e.g., by touch, finger gestures, a virtual keyboard, by providing a tap input (where a user lightly presses and quickly releases display screen 744), by providing a "touch-and-hold" input (where a user touches and holds his finger (or touch instrument) on display screen 744 for a predetermined period of time), by providing touch input that exceeds a predetermined pressure threshold, etc.). In addition to display screen 744, computing device 700 may include other peripheral output devices (not shown) such as speakers and printers.

Computing device 700 is connected to a network 748 (e.g., the Internet) through an adaptor or network interface 750, a modem 752, or other means for establishing communications over the network. Modem 752, which may be internal or external, may be connected to bus 706 via serial port interface 742, as shown in FIG. 7, or may be connected to bus 706 using another interface type, including a parallel interface.

As used herein, the terms "computer program medium," "computer-readable medium," and "computer-readable storage medium" are used to generally refer to physical hardware media such as the hard disk associated with hard disk drive 714, removable magnetic disk 718, removable optical disk 722, other physical hardware media such as RAMs, ROMs, flash memory cards, digital video disks, zip disks, MEMs, nanotechnology-based storage devices, and further types of physical/tangible hardware storage media (including system memory 704 of FIG. 7). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 732 and other programs 734) may be stored on the hard disk, magnetic disk, optical disk, ROM, RAM, or other hardware storage medium. Such computer programs may also be received via network interface 750, serial port interface 752, or any other interface type. Such computer programs, when executed or loaded by an application, enable computing device 700 to implement features of embodiments discussed herein. Accordingly, such computer programs represent controllers of the computing device 700.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Further Example Embodiments

A method is described herein. The method includes: for each data item of a data set: generating a first hash value for the data item; generating a leaf node at a first level of a tree-based data structure, the leaf node storing the first hash value of the data item; responsive to determining that the leaf node is an even leaf node with respect to the first level, performing at least one of: generating, at a second level of the tree-based data structure, an intermediary node of the tree-based data structure, the intermediary node storing a second hash value that is based on the first hash value of the leaf node and another first hash value of another leaf node of the first level that is a sibling of the leaf node; or generating, at a root level of the tree-based data structure, a root node of the tree-based data structure, the root node storing a root hash value that is based on the second hash value of the intermediary node and another second hash value of another intermediary node of the second level that is sibling of the intermediary node; and for each level of the tree-based data structure: storing, in a data structure, a respective hash value generated for the last odd node generated for the level.

In one implementation of the foregoing method, the method further comprises: comparing the root hash value to a previously-determined hash value for the data set; in response to determining that the root hash value is equal to the previously-determined hash value, determining that the data set has not been modified; and in response to determining that the root hash value is not equal to the previously-determined hash value: determining that the data set has been modified; and restoring the data set to a state before the data set was not modified.

In one implementation of the foregoing method, the method further comprises: determining that a particular transaction with respect to a data item of the data set comprises a savepoint; and in response to said determining, copying the hash values stored in the data structure.

In one implementation of the foregoing method, the method further comprises: detecting a request to roll back to the savepoint; and in response to said detecting, restoring the tree-based data structure in accordance with the copied hash values.

In one implementation of the foregoing method, the method further comprises: generating a leaf node for a last data item of the data set, the leaf node for the last data item storing a respective first hash value; determining that the leaf node for the last data item is an odd node with respect to the first level; and completing the tree-based data structure with at least one of one or more null nodes, one or more intermediary nodes, or a new root node, the one or more intermediary nodes storing a hash value that is based at least on the first hash value of the leaf node for the last data item.

In one implementation of the foregoing method, the tree-based data structure is a Merkle tree.

In one implementation of the foregoing method, the data set comprises at least one of: a ledger of transactions utilized in a block chain; or a plurality of rows in a relational table.

In one implementation of the foregoing method, the other first hash value is retrieved from the data structure to generate the second hash value, and the other second hash value is retrieved from the data structure to generate the root hash value.

A system is also disclosed. The system includes: at least one processor circuit; and at least one memory that stores program code configured to be executed by the at least one processor circuit, the program code comprising: a tree generator configured to: for each data item of a data set: generate a first hash value for the data item; generate a leaf node at a first level of a tree-based data structure, the leaf node storing the first hash value of the data item; responsive to determining that the leaf node is an even leaf node with respect to the first level, performing at least one of: generate, at a second level of the tree-based data structure, an intermediary node of the tree-based data structure, the intermediary node storing a second hash value that is based on the first hash value of the leaf node and another first hash value of another leaf node of the first level that is a sibling of the leaf node; or generate, at a root level of the tree-based data structure, a root node of the tree-based data structure, the root node storing a root hash value that is based on the second hash value of the intermediary node and another second hash value of another intermediary node of the second level that is a sibling of the intermediary node; and for each level of the tree-based data structure: store, in a data structure, a respective hash value generated for the last odd node generated for the level.

In one implementation of the foregoing system, the program code further comprises a data verifier configured to: compare the root hash value to a previously-determined hash value for the data set; in response to determining that the root hash value is equal to the previously-determined hash value, determine that the data set has not been modified; and in response to determining that the root hash value is not equal to the previously-determined hash value: determine that the data set has been modified; and restore the data set to a state before the data set was not modified.

In one implementation of the foregoing system, the program code further comprises a state restorer configured to: determine that a particular transaction with respect to a data item of the data set comprises a savepoint; and in response to said determining, copy the hash values stored in the data structure.

In one implementation of the foregoing system, the state restorer is further configured to: detect a request to roll back to the savepoint; and in response to said detecting, restore the tree-based data structure in accordance with the copied hash values.

In one implementation of the foregoing system, the tree generator is further configured to: generate a leaf node for a last data item of the data set, the leaf node for the last data item storing a respective first hash value; determine that the leaf node for the last data item is an odd node with respect to the first level; and complete the tree-based data structure with at least one of one or more null nodes, one or more intermediary nodes, or a new root node, the one or more intermediary nodes storing a hash value that is based at least on the first hash value of the leaf node for the last data item.

In one implementation of the foregoing system, the tree-based data structure is a Merkle tree.

In one implementation of the foregoing system, the data set comprises at least one of: a ledger of transactions utilized in a block chain; or a plurality of rows in a relational table.

A computer-readable storage medium having program instructions recorded thereon that, when executed by at least one processor, perform a method. The method includes: for each data item of the data set: generating a first hash value for a data item; generating a leaf node at a first level of a tree-based data structure, the leaf node storing the first hash value of the data item; responsive to determining that the leaf node is an even leaf node with respect to the first level, performing at least one of: generating, at a second level of the tree-based data structure, an intermediary node of the tree-based data structure, the intermediary node storing a second hash value that is based on the first hash value of the leaf node and another first hash value of another leaf node of the first level that is a sibling of the leaf node; or generating, at a root level of the tree-based data structure, a root node of the tree-based data structure, the root node storing a root hash value that is based on the second hash value of the intermediary node and another second hash value of another intermediary node of the second level that is a sibling of the intermediary node; and for each level of the tree-based data structure: storing, in a data structure, a respective hash value generated for the last odd node generated for the level.

In one implementation of the foregoing computer-readable storage medium, the method further comprises: comparing the root hash value to a previously-determined hash value for the data set; in response to determining that the root hash value is equal to the previously-determined hash value, determining that the data set has not been modified; and in response to determining that the root hash value is not equal to the previously-determined hash value: determining that the data set has been modified; and restoring the data set to a state before the data set was not modified.

In one implementation of the foregoing computer-readable storage medium, the method further comprises: determining that a particular transaction with respect to a data item of the data set comprises a savepoint; and in response to said determining, copying the hash values stored in the data structure.

In one implementation of the foregoing computer-readable storage medium, the method further comprises: detecting a request to roll back to the savepoint; and in response to said detecting, restoring the tree-based data structure in accordance with the copied hash values.

In one implementation of the foregoing computer-readable storage medium, the method further comprises: generating a leaf node for a last data item of the data set, the leaf node for the last data item storing a respective first hash value; determining that the leaf node for the last data item is an odd node with respect to the first level; and completing the tree-based data structure with at least one of one or more null nodes, one or more intermediary nodes, or a new root node, the one or more intermediary nodes storing a hash value that is based at least on the first hash value of the leaf node for the last data item.

In one implementation of the foregoing method, the tree-based data structure is a Merkle tree.

V Conclusion

While various example embodiments have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosure should not be limited by any of the above-described example embodiments, but should be defined only in accordance with the following claims and their equivalents.

What is claimed is:

1. A method, comprising:
   for each data item of a data set:
      generating a first hash value for a data item;
      generating a leaf node as a last leaf node of leaf nodes of a first level of a tree-based data structure, the leaf nodes of the first level arranged as alternating odd and even nodes, a first leaf node of the first level being an odd leaf node, the last leaf node storing the first hash value of the data item;
   responsive to determining that the last leaf node is an even leaf node with respect to the first level, performing at least one of:
      generating, at a second level of the tree-based data structure, an intermediary node of the tree-based data structure, the intermediary node storing a second hash value that is based on the first hash value of the last leaf node and another first hash value of another leaf node of the first level that is a sibling of the last leaf node; or
      generating, at a root level of the tree-based data structure, a root node of the tree-based data structure, the root node storing a root hash value that is based on the second hash value of the intermediary node and another second hash value of another intermediary node of the second level that is sibling of the intermediary node; and
   storing, in a data structure, a plurality of hash values, wherein each hash value of the plurality of hash values stored in the data structure is a hash value of a last odd node of a corresponding level of a plurality of levels of the tree-based structure, the data structure maintaining a state of the tree-based data structure that enables a determination of an integrity of the data set.

2. The method of claim 1, further comprising:
   comparing the root hash value to a previously-determined hash value for the data set;
   in response to determining that the root hash value is equal to the previously-determined hash value, determining that the data set has not been modified; and
   in response to determining that the root hash value is not equal to the previously-determined hash value:
      determining that the data set has been modified; and
      restoring the data set to a state before the data set was not modified.

3. The method of claim 1, further comprising:
   determining that a particular transaction with respect to a data item of the data set comprises a savepoint; and
   in response to said determining, copying the hash values stored in the data structure.

4. The method of claim 3, further comprising:
   detecting a request to roll back to the savepoint; and
   in response to said detecting, restoring the tree-based data structure in accordance with the copied hash values.

5. The method of claim 1, further comprising:
   generating a leaf node for a last data item of the data set, the leaf node for the last data item storing a respective first hash value;
   determining that the leaf node for the last data item is an odd node with respect to the first level; and
   completing the tree-based data structure with at least one of one or more null nodes, one or more intermediary nodes, or a new root node, the one or more intermediary nodes storing a hash value that is based at least on the first hash value of the leaf node for the last data item.

6. The method of claim 1, wherein the tree-based data structure is a Merkle tree.

7. The method of claim 1, wherein the data set comprises at least one of:
   a ledger of transactions utilized in a block chain; or
   a plurality of rows in a relational table.

8. The method of claim 1, wherein the other first hash value is retrieved from the data structure to generate the second hash value, and wherein the other second hash value is retrieved from the data structure to generate the root hash value.

9. A system, comprising:
at least one processor circuit; and
at least one memory that stores program code configured to be executed by the at least one processor circuit, the program code comprising:
a tree generator configured to:
for each data item of a data set:
generate a first hash value for the data item;
generate a leaf node as a last leaf node of leaf nodes of a first level of a tree-based data structure, the leaf nodes of the first level arranged as alternating odd and even nodes, a first leaf node of the first level being an odd leaf node, the last leaf node storing the first hash value of the data item;
responsive to determining that the leaf node is an even leaf node with respect to the first level, performing at least one of:
generate, at a second level of the tree-based data structure, an intermediary node of the tree-based data structure, the intermediary node storing a second hash value that is based on the first hash value of the leaf node and another first hash value of another leaf node of the first level that is a sibling of the leaf node; or
generate, at a root level of the tree-based data structure, a root node of the tree-based data structure, the root node storing a root hash value that is based on the second hash value of the intermediary node and another second hash value of another intermediary node of the second level that is a sibling of the intermediary node; and
store, in a data structure, a plurality of hash values, wherein each hash value of the plurality of hash values stored in the data structure is a hash value of a last odd node of a corresponding level of a plurality of levels of the tree-based structure, the data structure maintaining a state of the tree-based data structure that enables a determination of an integrity of the data set.

10. The system of claim 9, the program code further comprising a data verifier configured to:
compare the root hash value to a previously-determined hash value for the data set;
in response to determining that the root hash value is equal to the previously-determined hash value, determine that the data set has not been modified; and
in response to determining that the root hash value is not equal to the previously-determined hash value:
determine that the data set has been modified; and
restore the data set to a state before the data set was not modified.

11. The system of claim 9, the program code further comprising a state restorer configured to:
determine that a particular transaction with respect to a data item of the data set comprises a savepoint; and
in response to said determining, copy the hash values stored in the data structure.

12. The system of claim 11, the state restorer further configured to:
detect a request to roll back to the savepoint; and
in response to said detecting, restore the tree-based data structure in accordance with the copied hash values.

13. The system of claim 9, the tree generator further configured to:
generate a leaf node for a last data item of the data set, the leaf node for the last data item storing a respective first hash value;
determine that the leaf node for the last data item is an odd node with respect to the first level; and
complete the tree-based data structure with at least one of one or more null nodes, one or more intermediary nodes, or a new root node, the one or more intermediary nodes storing a hash value that is based at least on the first hash value of the leaf node for the last data item.

14. The system of claim 9, wherein the tree-based data structure is a Merkle tree.

15. The system of claim 9, wherein the data set comprises at least one of:
a ledger of transactions utilized in a block chain; or
a plurality of rows in a relational table.

16. A computer-readable storage medium having program instructions recorded thereon that, when executed by at least one processor of a computing device, perform a method, the method comprising:
for each data item of a data set:
generating a first hash value for the data item;
generating a leaf node as a last leaf node of leaf nodes of a first level of a tree-based data structure, the leaf nodes of the first level arranged as alternating odd and even nodes, a first leaf node of the first level being an odd leaf node, the last leaf node storing the first hash value of the data item;
responsive to determining that the leaf node is an even leaf node with respect to the first level, performing at least one of:
generating, at a second level of the tree-based data structure, an intermediary node of the tree-based data structure, the intermediary node storing a second hash value that is based on the first hash value of the leaf node and another first hash value of another leaf node of the first level that is a sibling of the leaf node; or
generating, at a root level of the tree-based data structure, a root node of the tree-based data structure, the root node storing a root hash value that is based on the second hash value of the intermediary node and another second hash value of another intermediary node of the second level that is a sibling of the intermediary node; and
storing, in a data structure, a plurality of hash values, wherein each hash value of the plurality of hash values stored in the data structure is a hash value of a last odd node of a corresponding level of a plurality of levels of the tree-based structure, the data structure maintaining a state of the tree-based data structure that enables a determination of an integrity of the data set.

17. The computer-readable storage medium of claim 16, the method further comprising:
comparing the root hash value to a previously-determined hash value for the data set;
in response to determining that the root hash value is equal to the previously-determined hash value, determining that the data set has not been modified; and
in response to determining that the root hash value is not equal to the previously-determined hash value:
determining that the data set has been modified; and
restoring the data set to a state before the data set was not modified.

18. The computer-readable storage medium of claim 16, the method further comprising:
    determining that a particular transaction with respect to a data item of the data set comprises a savepoint; and
    in response to said determining, copying the hash values stored in the data structure.

19. The computer-readable storage medium of claim 18, the method further comprising:
    detecting a request to roll back to the savepoint; and
    in response to said detecting, restoring the tree-based data structure in accordance with the copied hash values.

20. The computer-readable storage medium of claim 16, the method further comprising:
    generating a leaf node for a last data item of the data set, the leaf node for the last data item storing a respective first hash value;
    determining that the leaf node for the last data item is an odd node with respect to the first level; and
    completing the tree-based data structure with at least one of one or more null nodes, one or more intermediary nodes, or a new root node, the one or more intermediary nodes storing a hash value that is based at least on the first hash value of the leaf node for the last data item.

\* \* \* \* \*